US011625627B2

(12) United States Patent
Kumar et al.

(10) Patent No.: US 11,625,627 B2
(45) Date of Patent: Apr. 11, 2023

(54) PREDICTED FORECAST OFFSET FROM REMOTE LOCATION SENSOR

(71) Applicant: Microsoft Technology Licensing, LLC, Redmond, WA (US)

(72) Inventors: Peeyush Kumar, Seattle, WA (US); Ranveer Chandra, Kirkland, WA (US); Chetan Bansal, Seattle, WA (US); Dang Khoa Tran, Redmond, WA (US); Emmanuel Azuh Mensah, Seattle, WA (US); Michael Raymond Grant, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 16/917,702

(22) Filed: Jun. 30, 2020

(65) Prior Publication Data

US 2021/0326723 A1    Oct. 21, 2021

Related U.S. Application Data

(60) Provisional application No. 63/013,162, filed on Apr. 21, 2020.

(51) Int. Cl.
*G06N 5/04*     (2006.01)
*G06N 20/00*    (2019.01)
*G01W 1/10*     (2006.01)

(52) U.S. Cl.
CPC .............. *G06N 5/04* (2013.01); *G01W 1/10* (2013.01); *G06N 20/00* (2019.01)

(58) Field of Classification Search
CPC ............ G06N 5/04; G06N 20/00; G01W 1/10
See application file for complete search history.

(56) References Cited

U.S. PATENT DOCUMENTS 10,798,891 B2 * 10/2020 Allen ................... A01G 25/167
2017/0261645 A1 *  9/2017 Kleeman ................. G01W 1/10
2018/0223814 A1 *  8/2018 Badrinath Krishna .. G06N 3/04
(Continued)

OTHER PUBLICATIONS

Liang et al. (Liang Yuxuan et al., Geoman: Multilevel Attention Networks for Geo-Sensory Time Series Prediction, Preceedings of the Twenty-Seventh Internation Joint Conference on Artificial Intelligence, Jul. 1, 2018, pp. 3428-3434) (Year: 2018).*
(Continued)

*Primary Examiner* — Raymond L Nimox
(74) *Attorney, Agent, or Firm* — Alleman Hall Creasman & Tuttle LLP

(57) ABSTRACT

A computing system configured to execute a predictive program is provided. The predictive program, in a run-time phase, receives a current value for a remotely sourced forecast as run-time input into an artificial intelligence model. The artificial intelligence model has been trained on training data including a time series of locally sourced measurements for a parameter and a time series of remotely sourced forecast data for the parameter. The predictive program outputs a predicted forecast offset between the current value of a remotely sourced forecast and a future locally sourced measurement for the parameter. The predictive program outputs from the artificial intelligence model a predicted forecast offset based on the run-time input.

18 Claims, 18 Drawing Sheets

(56) References Cited

U.S. PATENT DOCUMENTS

2021/0199850 A1* 7/2021 Schmude ............... G01W 1/10
2022/0003894 A1* 1/2022 Shapiro ................ G06N 3/088

OTHER PUBLICATIONS

"International Search Report and Written Opinion Issued in PCT Application No. PCT/US21/022262", dated Jul. 15, 2021, 12 Pages.
Liang, et al., "GeoMAN: Multi-level Attention Networks for Geosensory Time Series Prediction", In Proceedings of the Twenty-Seventh International Joint Conference on Artificial Intelligence, Jul. 1, 2018, pp. 3428-3434.
Wang, et al., "Wavelet Decomposition and Convolutional LSTM Networks Based Improved Deep Learning Model for Solar Irradiance Forecasting", In Journal of Applied Sciences, vol. 8, Issue 8, Aug. 1, 2018, 29 Pages.
Yoon, et al., "Time-series Generative Adversarial Networks", In Proceedings of 33rd Conference on Neural Information Processing Systems, Jan. 1, 2019, 11 Pages.
Zhao, et al., "Forecasting Wavelet Transformed Time Series with Attentive Neural Networks", In Proceedings of the EEE International Conference on Data Mining, Nov. 17, 2018, pp. 1452-1457.
Allegrini, et al., "Coupled CFD and Building Energy Simulations for Studying the Impacts of Building Height Topology and Buoyancy on Local Urban Micro-climates", In Journal of Urban Climate, vol. 21, Sep. 3, 2017, 31 Pages.
Armstrong, J. Scott, et al., "Long-Range Forecasting From Crystal Ball to Computer", In Publication of Wiley-Interscience, 1985, 42 Pages.
Zou, et al., "Verification and Predicting Temperature and Humidity in a Solar Greenhouse Based on Convex Bidirectional Extreme Learning Machine Algorithm", In Journal of Neurocomputing, vol. 249, Aug. 2, 2017, pp. 72-85.
Azuh, et al., "Towards Bilingual Lexicon Discovery from Visually Grounded Speech Audio", In Proceedings of the 20th Annual Conference of the International Speech Communication Association, Sep. 15, 2019, pp. 276-280.
Cai, et al., "Research on Soil Moisture Prediction Model Based on Deep Learning", In Journal of PloS one, vol. 14, Issue 4, Apr. 3, 2019, 19 Pages.
Cinar, et al., "Position-based Content Attention for Time Series Forecasting with Sequence-to-sequence RNNs", In Proceedings of the 24th International Conference on Neural Information Processing, Nov. 14, 201.
Dhamala, et al., "Multivariate Time-Series Similarity Assessment via Unsupervised Representation Learning and Stratified Locality Sensitive Hashing: Application to Early Acute Hypotensive Episode Detection", In Journal of IEEE Sensors Letters,vol. 3, Issue 1, Jan. 16, 2019, 4 Pages.
Eleftheriou, et al., "Micro Climate Prediction Utilising Machine Learning Approaches", In Proceedings of the IEEE International Workshop on Metrology for the Sea; Learning to Measure Sea Health Parameters, Oct. 8, 2018, pp. 197-200.
Fawaz, et al., "InceptionTime: Finding AlexNet for Time Series Classification", In Repository of arXiv:1909.04939, Sep. 13, 2019, 27 Pages.
Fu, et al., "Time Series Simulation by Conditional Generative Adversarial Net", In Repository of arXiv:1904.11419, Apr. 25, 2019, 33 Pages.
Galaso, et al., "The Influence of Microclimate on Architectural Projects: A Bioclimatic Analysis of the Single-Family Detached House in Spain's Mediterranean Climate", In Journal of Energy Efficiency, vol. 9, Issue 3, Jun. 2016, pp. 621-645.
Ghamariadyan, et al., "A Hybrid Wavelet Neural Network (HWNN) for Forecasting Rainfall using Temperature and Climate Indices", In Journal of IOP Conference Series: Earth and Environmental Science. vol. 351, Issue 1, Oct. 2019, 10 Pages.
Goodfellow, et al., "Generative Adversarial Nets", In Proceedings of the 27th International Conference on Neural Information Processing Systems, vol. 2, Dec. 8, 2014, 9 Pages.
Gu, et al., "Wind Farm NWP Data Preprocessing Method Based on t-SNE", In Journal of Energies, vol. 12, Issue 19, Sep. 23, 2019, 16 Pages.
He, et al., "Delving Deep into Rectifiers: Surpassing Human-Level Performance on ImageNet Classification", In Proceedings of the IEEE International Conference on Computer Vision, Dec. 7, 2015, pp. 1026-1034.
Hummel, et al., "Soil Moisture and Organic Matter Prediction of Surface and Subsurface Soils using an NIR Soil Sensor", In Journal of Computers and Electronics in Agriculture, vol. 32, Issue 2, Aug. 2001, pp. 149-165.
Jones, M. B., "Plant Microclimate", In Journal of Photosynthesis and Production in a Changing Environment, 1993, pp. 47-64.
Kingma, et al., "Adam: A Method for Stochastic Optimization", In Repository of arXiv:1412.6980v1, Dec. 22, 2014, 9 Pages.
Li, et al., "Vision-to-Language Tasks Based on Attributes and Attention Mechanism", In Proceedings of the IEEE Transactions on Cybernetics, May 17, 2019, 14 Pages.
Liu, et al., "Smart Deep Learning Based Wind Speed Prediction Model Using Wavelet Packet Decomposition, Convolutional Neural Network and Convolutional Long Short Term Memory Network", In Journal of Energy Conversion and Management, vol. 166, Jun. 15, 2018, pp. 120-131.
Lynch, Peter, "The Origins of Computer Weather Prediction and Climate Modeling", In Journal of Computational Physics, vol. 227, Issue 7, Mar. 20, 2008, 14 Pages.
McLaughlin, Kathleen, "Gaps in 4G Network Hinder High-Tech Agriculture: FCC Prepares to Release 500 Million to Improve Coverage", Retrieved from: https://www.bendbulletin.com/business/gaps-in-4g-network-hinder-high-tech-agriculture/article_c3b935f9-a803-5a0f-9b95-91dc06217b79.html, Jul. 31, 2016, 5 Pages.
Mirza, et al., "Conditional Generative Adversarial Nets", In Repository of arXiv: 1411.1784, Nov. 6, 2014, 7 Pages.
Moon, et al., "Microcilmate-Based Predictive Weather Station Platform: A Case Study for Frost Forecast", Retrieved from: http://ieee-hpec.org/2017/techprog2017/index_htm_files/104.pdf, 2017, 2 Pages.
Papagiannaki, et al., "Agricultural Losses Related to Frost Events: Use of the 850 hPa Level Temperature as an Explanatory Variable of the Damage Cost", In Journal of Natural Hazards and Earth System Sciences, vol. 14, Issue 9, Sep. 8, 2014, pp. 2375-2386.
Ravikumar, et al., "On the Use of Wavelets Packet Decomposition for Time Series Prediction", In Journal of Applied Mathematical Sciences, vol. 8, Issue 58, 2014, pp. 2847-2858.
Zheng, et al., "Frost Trends and their Estimated Impact on Yield in the Australian Wheatbelt", In Journal of Experimental Botany, vol. 66, Issue 12, Apr. 28, 2015, pp. 3611-3623.
Singh, et al., "Development of a Microclimate Model for Prediction of Temperatures Inside a Naturally Ventilated Greenhouse Under Cucumber Crop in Soilless Media", In Journal of Computers and Electronics in Agriculture, vol. 154, Nov. 2018, pp. 227-238.
Sutskever, et al., "Sequence to Sequence Learning with Neural Networks", In Proceedings of the 27th International Conference on Neural Information Processing Systems, Dec. 8, 2014, 9 Pages.
Vanwalleghem, et al., "Predicting Forest Microclimate in Heterogeneous Landscapes", In Journal of Ecosystems, vol. 12, Issue 7, Nov. 2009, pp. 1158-117.
Vasisht, et al., "Farmbeats: An Iot Platform for Data-driven Agriculture", In Proceedings of the 14th USENIX Symposium on Networked Systems Design and Implementation, Mar. 27, 2017, pp. 515-529.
Vinyals, et al., "Pointer Networks", In Proceedings of the Annual Conference on Neural Information Processing Systems, Dec. 7, 2015, 9 Pages.
Wiese, et al., "Quant GANs: Deep Generation of Financial Time Series", In Repository of arXiv: 1907.06673, Dec. 21, 2019, 30 Pages.
Yano, et al., "Scientific Challenges of Convective-Scale Numerical Weather Prediction", In Journal of Bulletin of the American Meteorological Society, vol. 99, Issue 4, Apr. 2018, pp. 699-710.

(56) References Cited

OTHER PUBLICATIONS

Zellweger, et al., "Advances in Microclimate Ecology Arising from Remote Sensing", In Journal of Trends in Ecology & Evolution, vol. 34, Issue 4, Apr. 2019, pp. 327-341.

* cited by examiner

Algorithm 1: DeepMC GAN model for transfer learning

Result: Updated DeepMC model
for Number of training iterations do
    for Number of training iterations do
        Sample minibatch of training samples for the discriminator model;
        Train/Update the discriminator model;
    end
    Freeze the discriminator weights from updating;
    Sample minibatch of training sample for the combined DeepMC and discriminator model;
    Update the generator DeepMC model (while pitted against the adversary);
end

FIG. 15

PREDICTED FORECAST OFFSET FROM REMOTE LOCATION SENSOR

CROSS REFERENCE TO RELATED APPLICATIONS

This application claims priority to U.S. Provisional Patent Application Ser. No. 63/013,162, filed Apr. 21, 2020, the entirety of which is hereby incorporated herein by reference for all purposes.

BACKGROUND

Predicting future conditions of a spatial system that is at least partially located in a first location can be difficult when based on input data from sensors, etc., from another location. For example, where large-scale sensor deployments exist, such as in a weather station network, the accuracy of predictions decreases as the distance from that the sensor deployments increases. Building additional large-scale sensor system deployments can increase prediction accuracy but may be cost prohibitive and time consuming. Even if such cost is incurred, interstitial regions will nearly always exist that suffer from the original problem. In a related field that also processes time series data from disparate locations, it may be difficult to make accurate predictions of economic conditions for a first region based on a series economic data sourced in a different region.

SUMMARY

To address the above issues, a computing system is provided that is configured to execute a predictive program. The predictive program, in a run-time phase, receives a current value for a remotely sourced forecast as run-time input into an artificial intelligence model. The artificial intelligence model has been trained on training data including a time series of locally sourced measurements for a parameter and a time series of remotely sourced forecast data for the parameter. The predictive program outputs a predicted forecast offset between the current value of a remotely sourced forecast and a future locally sourced measurement for the parameter. The predictive program outputs from the artificial intelligence model a predicted forecast offset based on the run-time input.

According to another aspect, a computing system is provided that comprises a processor and associated memory storing instructions including a predictive program executed by the processor. The predictive program may receive from a local sensor a time series of sensor inputs indicating respective measured values of a parameter over a time period, the sensor being geolocated in a first location. The predictive program may further receive time series of forecast values for the parameter from a forecast source, the forecast values having been computed based on data from sensors that are geographically remote from the first location. The predictive program may further perform preprocessing of the time series of sensor inputs using a predictive model to thereby compute a predicted value for the parameter for at each successive time step in the time series. The predictive program may perform a forecast offset computation at each time step in the time series by determining the difference between the predicted value and the forecast value at each time step, to thereby compute a time series of forecast offsets. The predictive program may perform a signal decomposition on the time series of forecast offsets, wherein the time series of forecast offsets is decomposed into a multi-scale data set including at least short scale data and long scale data. The predictive program may process the multi-scale data set by inputting the short scale data into a short scale neural network to thereby extract short scale features of the short scale data, and by inputting the long scale data into a long scale neural network to thereby extract long scale features of the long scale data, at each time step in the time series. The predictive program may apply a multi-level attention mechanism, having at least two attention levels, to the extracted short scale features and long scale features, the two attention levels including a position-based content attention layer and a scale-guided attention layer, to generate respective short scale and long scale context vectors, at each time step in the time series. The predictive program may perform a decoder computation in which a decoder receives the respective short scale and long scale context vectors and computes a predicted forecast offset, at each time step in the time series.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 15 illustrates an algorithm for transfer learning by the GAN of FIG. 4.

DETAILED DESCRIPTION

Figure 1:
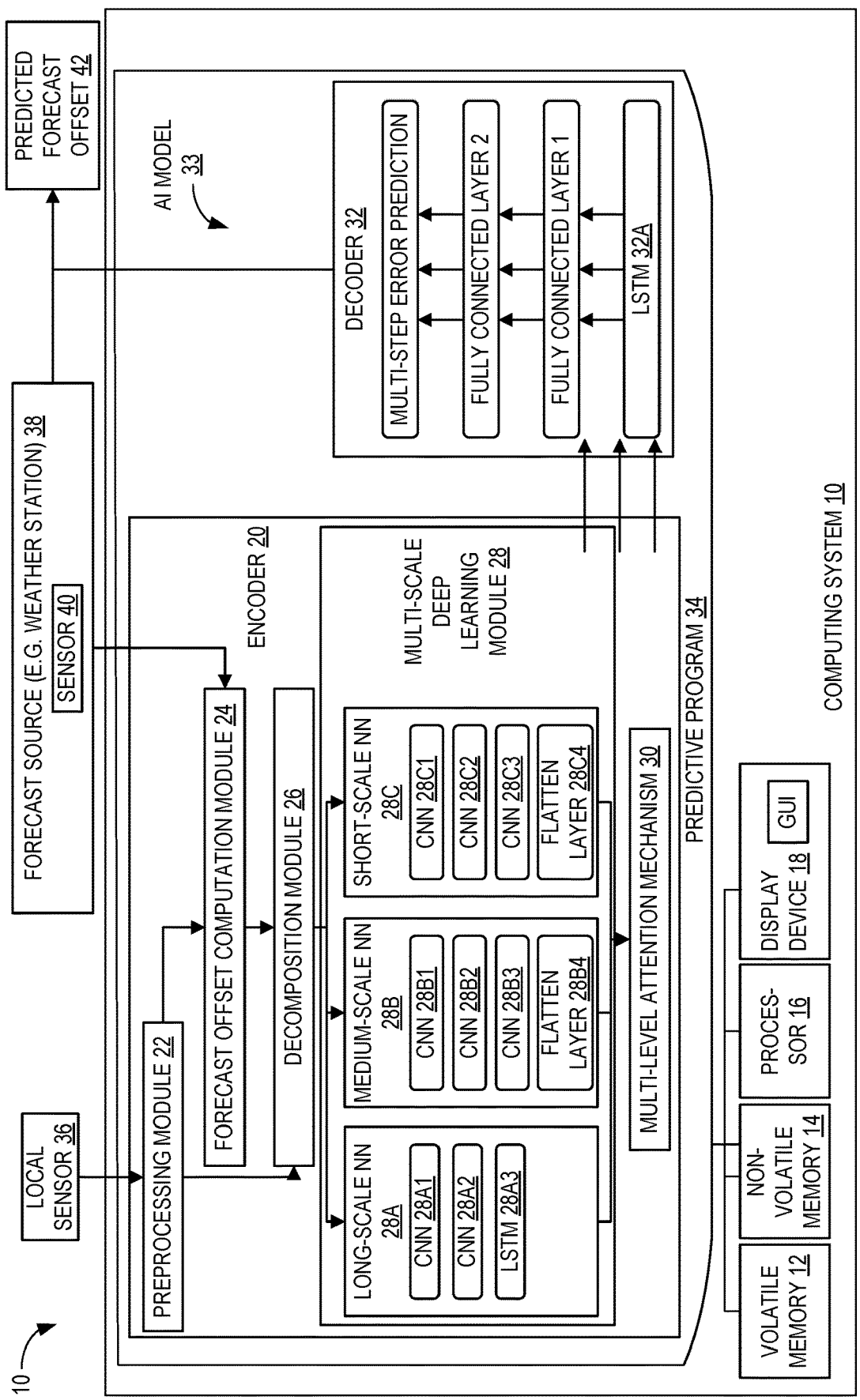
FIG. 1 shows an example architecture of a computing system executing a predictive program, according to an embodiment of the present disclosure.

The present disclosure presents a deep learning approach for a comprehensive microclimate prediction framework, which can be extended to application in other fields as well. Throughout this disclosure, this framework will be described generally with reference to the computer system 10 shown in the Figures. One specific example implementation of this framework on computer system 10 is referred to throughout the present disclosure as DeepMC, which stands for Deep MicroClimate.

Microclimate refers to a climate of a relatively small and homogenous geographic region and can be defined in terms of a set of one or more climatic parameters. Microclimate predictions are of importance across various endeavors, such as agriculture, forestry, electric power generation, oil and gas distribution, hospitality, outdoor and leisure, search and rescue, to name a few. The framework disclosed herein is configured to predict climatic parameters, such as soil moisture, humidity, wind speed, soil temperature, and ambient (or free air) temperature, at forecast intervals over a forecast period. In the DeepMC example implementation, the forecast period varies between 12 hours to 120 hours with and the forecast interval varies between one hour and six hours, although other ranges are possible.

By way of overview, this framework enables localization of weather forecasts via use of Internet of Things (IoT) sensors (i.e., remotely connected sensors connected to an end-user's local area network and configured access to the internet using a wired or wireless internet access point) by fusing traditional weather station forecasts based on fixed sensors associated with a weather station with the increased resolution of IoT sensor data, sampled at multiple frequencies. A multi-scale encoder and a two-level attention mechanism that learns a latent representation of the interaction between various resolutions (i.e., scales) of the IoT sensor data and weather station forecasts are utilized. A generative adversarial network (GAN)-based transfer learning mechanism for time series is used, which updates a trained model from a source domain where labelled data is available to a target live domain with insufficient labelled data. A heuristic mechanism that allows for separation of domain expertise and methodological knowledge is also applied. To illustrate the framework, multiple real-world agricultural scenarios and experimental results are discussed, in some cases improving accuracy by 90% or more over conventional methods.

Example Scenario

In a first example scenario, it is the month of April and a farm in Eastern Washington, USA is producing wheat and lentil crops. Spring is just settling in while the temperature is slightly above freezing. A farmer is getting ready to fertilize his fields as the conditions become safe from a winter runoff and frost. Plants are significantly susceptible to fertilizers at freezing temperatures, therefore, the farmer consults a local weather station for temperature forecasts, which is located in the closest metropolitan valley about 50 miles away from the farm. The three-day predictions show consistent temperatures above the freezing point. The farmer rents equipment and purchases fertilizer and starts fertilizing the farm. For some nights, the temperature in certain parts of the field drops below freezing and kills around 20% of the crop. As this example scenario illustrates, despite the availability of weather forecasts from such commercial weather stations, differences between available forecasts and actual conditions can adversely affect up to 20% of crops, according to some estimates. This can be compounded by the fact that climatic parameters not only vary between a local farm and the nearest weather station but also between individual plants located in different regions within a farm. Thus, even when remedial methods are available for warming the air locally to avoid damaging cold, for example, such methods may not be applied when a temperature sensor at the farm is placed in a relatively warm region of the farm and indicates that they are not necessary, potentially damaging plants located in colder regions of the farm.

1. TECHNICAL CHALLENGES

Turning now to the challenges associated with modeling climatic parameters, it will be appreciated that climatic parameters are stochastic in nature and thus difficult to model for prediction tasks. Some of the specific challenges for developing a framework for microclimate predictions include the following.

a) Separation of Domain and Methodological Knowledge.

Various factors influence the trend of a particular climatic parameter of interest. For example, soil moisture predictions are correlated with climatic parameters such as ambient temperature, humidity, precipitation and soil temperature, while ambient humidity is correlated with parameters such as ambient temperature, wind speed and precipitation. This creates a challenge for a machine learning system to accept vectors of varying dimensions as input. The techniques described herein and implemented in DeepMC solve this problem by first, decomposing the input into signals across various scales for each feature and combining them through a paired cartesian product, and then using a heuristic to apply specialized architecture for specific scales. This heuristic assigns the components of the architecture based on the nature of the paired scales rather than specific feature, enabling adaptability for varying input dimensions, as discussed in more detail below.

b) Non Stationary Features

Non stationarity of the climatic time series data makes it difficult to model the input-output relationship. Each input feature affects the output variable at a different temporal scale. For example, the effect of precipitation on soil moisture is instantaneous while the effect of temperature on soil moisture is accumulated over time. In order to capture these varying effects an effective prediction model needs to capture multiple trends in the data in a stationary way. The techniques described herein and implemented in DeepMC utilize a multi-scale wavelet decomposition-based approach to capture these effects, discussed below. This approach decomposes the input signals into various scales capturing trends and details in the data.

c) Transferring Models Learned in One Domain to Another

Any system for microclimate predictions is expected to perform across various terrains, geographic conditions, and climate conditions. In practice, labelled data of sufficient quality is generally not available. Even if labeled data is accessible, it is not available for every terrain, geographic condition, or climatic conditions. Therefore, improved techniques are required to transfer learning from a model trained in one domain to another domain with little paired data in labelled datasets. DeepMC utilizes a GAN-based approach for transfer learning, as discussed below.

d) Result Accuracy

Generating high accuracy results is a challenge for any real-world deployment of a machine learning solution. In the context of microclimate predictions, the challenges described above—small quantity of labelled datasets, heterogeneity of features and non-stationary of input features make the learning problem itself especially difficult. In the approaches described herein, instead of predicting a climatic parameter directly, an error, referred to as a forecast offset, between a nearest weather station forecast and local microclimate forecast is predicted. This is based on the idea that hyperlocalization of weather station forecasts is easier to learn than learning the relationships of the predicted climatic parameter with the predictor climatic parameters from ground up. DeepMC has achieved acceptable accuracy using this design model with reported accuracy improvement of up to 90% or more in mean absolute percentage error (MAPE) accuracy for direct learning and of up to 85% or more after transfer learning, as discussed below.

2. PRACTICAL ENGINEERING CONSIDERATIONS

For this research, several characteristics for engineering a real-world microclimate prediction system have identified, as follows.

Architecture adaptability. In practice, microclimate prediction is not an exact science. There are many physical models available to characterize the weather dynamics, but these models cannot be used as-is in practice due to various factors such as constraints on model usability, data availability and application specific characteristics. Deep learning methods alleviate some of these challenges enabling learning relationships between various climatic parameters, provided there is enough data in labelled datasets of sufficiently high quality. In many cases, the domain specific knowledge is captured by domain experts, such as agronomists, producers, etc., in the technical domain of agriculture. The domain experts will generally define a set of input parameters (the predictors) which would affect the predicted parameter based on the data available for that application. This variability generally means that the architecture input dimension cannot be fixed. Therefore, there is a requirement for the system architecture to be adaptable for varying input dimensions. This variability is only across applications and the dimensions can be assumed fixed once an application is specified.

High prediction accuracy. Microclimate prediction aids various decisions on a farm. Among others, certain operational decisions such as seeding, irrigating, fertilizing, harvesting, etc., can have high economic and work-effort consequences. These decisions are sensitive to minor changes in weather forecasts and therefore, there is a general requirement for high degree of accuracy in the predictions.

Warm start. When a new IoT system is deployed on a farm, there is an economical requirement for microclimate predictions to be displayed with as little delay as possible. This generally means, that there is not enough data at that location to retrain the entire model. The models trained in other locations cannot be used as-is because microclimate is highly specific to the local geography and atmosphere. Therefore, this translates to the technical requirement for effectively transferring models learned on stock datasets or other sensor locations to the current location of interest.

Data collection and data delivery. In order to develop a microclimate prediction system, real-time data from sensor locations at the farm is generally utilized. More often than not, applications which require microclimate prediction have very low computer network coverage (i.e., wireless or wired LAN or Internet access). One objective is to get the farm data to a cloud storage location reliably and in real-time. Additionally, it is also highly valued to present the prediction results through a medium which can be ingested and understood by the end user in real-time.

DeepMC, implementing the techniques described herein, has been designed to satisfy the above requirements. The passages below describe how the data requirements are satisfied for both-ingesting data to predict microclimate and showcasing predictions for the end user to intake. Further passages present details on the architecture and how it solves many of the challenges described in this section above. Further passages describe a GAN-based approach for transferring learnings from DeepMC models trained on one dataset to another domain where data from a labelled dataset is limited. Finally, additional passages provide some scenarios where DeepMC has been used experimentally and demonstrates the performance of DeepMC across various applications and regions around the world.

3. PLATFORM

The DeepMC implementation uses weather station forecasts and IoT sensor deployments through the FarmBeats platform from Microsoft® Research to predict micro-climatic parameters in real time.

Weather Station Forecasts. Weather station forecasts are collected for training and inference through commercial weather stations. The model is trained and tested with various weather data providers, including DarkSky, NOAA, AgWeatherNet, National Weather Service and DTN.

IoT Sensor Climate Data. DeepMC uses the FarmBeats platform to collect climatic and soil data from multiple sensors around the world. FarmBeats is an end-to-end IoT platform for data-driven agriculture, which provides consistent data collection from various sensor types with varying bandwidth constraints. The FarmBeats system was chosen for this work because of high system reliability and system availability, especially during events such as power and Internet outages caused by bad weather, scenarios that are fairly common for a farm. This data collected by FarmBeats IoT sensors is persisted in the cloud and accessed there.

The FarmBeats platform dashboard is also used to deliver microclimate predictions to the end-users using their Azure® marketplace offering.

4. COMPUTER SYSTEM FOR MICROCLIMATE PREDICTION: DEEPMC ARCHITECTURE

To address the issues described above, FIG. 1 illustrates an example computing system 10 comprising volatile memory 12, non-volatile memory 14, a processor 16, and a display 18, linked by a communications bus. The processor 16 is configured to execute a predictive program 34 stored in non-volatile memory, using portions of volatile memory, to achieve the functionality described below.

As an overview, the predictive program 34 when executed by the processor 16 causes the processor 16 to operate in a training phase. The processor 16 receive as training data a time series of locally sourced measurements for a parameter, which may come from a local sensor 36, and a time series of remotely sourced forecast data for the parameter, which may come from a forecast source 38. The processor 16 trains an artificial intelligence model 33 based on the training data to output a predicted forecast offset 42 between a current value of a remotely sourced forecast and a future locally sourced measurement for the parameter. In a run-time phase, the predictive program receives a current value for a remotely sourced forecast, which may come from a forecast source 38 and serve as run-time input into the artificial intelligence model 33. The processor 16 outputs from the artificial intelligence model 33 a predicted forecast offset 42 based on the run-time input. The processor 16 is further configured to compute a local forecast as a sum of the predicted forecast offset and the current value of the remotely sourced forecast, and output the local forecast to cause a display device 18 associated with the computing system to display the local forecast.

Continuing with FIG. 1, the framework of the artificial intelligence model 33 is based on a sequence-to-sequence encoder-decoder framework. An encoder 20 of this framework includes the following components: a preprocessing module 22, a forecast offset computation module 24, a decomposition module 26, a multi-scale deep learning module 28, and a multi-level attention mechanism 30. The decoder 32 includes a multi-layer LSTM and one or more fully connected layers connected to an output side of the LSTM. Each component of the framework is described in the following subsections.

4.1 Preprocessing of Sensor Data

The artificial intelligence model 33 of the predictive program 34 is stored in non-volatile memory 14, which, when executed by the processor 16 causes the processor 16 to perform the following functions using portions of the volatile memory 12. Although a single processor is shown schematically in FIG. 1 it will be appreciated that plural processors may be used, and further that a plurality of memory locations may be used. The processor 16 may be hardware or virtualized, as may the memory. To the preprocessing flow, preprocessing module 22 implemented by the processor 16 is configured to receive from a local sensor 36 a time series of sensor inputs indicating respective measured values of a parameter over a time period, the local sensor 36 being geolocated in a first location. The preprocessing module 22 executed by processor 16 is configured to perform preprocessing of the time series of sensor inputs using a predictive model to thereby compute a predicted value for the parameter for at each successive time step in the time series. The preprocessing may be performed using an autoregressive integrated moving average model, or other suitable methods. In one embodiment, the parameter is a climatic parameter, the forecast source is a weather station 38, and the predicted forecast offset 42 is a predicted weather forecast offset for the climatic parameter.

Turning now to a specific implementation of the present disclosure, the computing system may be configured as follows. Sensor data is received using IoT sensors deployed on the farm. Raw data which is received from the sensors is usually noisy with missing data and with varying temporal resolution. Temporal resolution is standardized using average values for the data collected. Weather data from the sensors is denoted as a tuple $(z_k, y_k)$, where y is the climatic parameter to be predicted, z is the multivariate predictor (i.e., the climatic data that affects the predicted parameter), and k is the time epoch when the corresponding values were recorded. The required temporal resolution is denoted to be $\Delta$, and the values $(z_t, y_t)$ are the averaged values within the time interval $[k, k+\Delta]$.

$$(z_t, y_t) = \left( \sum_k^{k+\Delta} z_k, \sum_k^{k+\Delta} y_k \right)$$

An autoregressive integrated moving average (ARIMA) forecasting model is used to fill in missing data in the series, for example due to hardware failures (e.g., in-field contamination due to dust, dirt, insects, loss of power, damage due to weather or animals, etc.) or communication failures (data transmission loss, etc.).

4.2 Forecast Offset Computation

Returning to the computing system of the present disclosure, a forecast offset computation module 24 of the computing system 10 executed by processor 16 receives a time series of forecast values for the parameter from a forecast source 38. The forecast values have been computed (e.g., by a computing device at the forecast source 38) based on data from sensors 40 that are geographically remote from the first location. The forecast offset computation module 24 further is configured to perform a forecast offset computation at each time step in the time series by determining the difference between the predicted value and the forecast value at each time step, to thereby compute a time series of forecast offsets.

A specific implementation of this functionality may be realized as follows. The DeepMC implementation uses weather station forecasts of the predicted variable to learn better models for microclimate predictions. Instead of predicting the climatic parameter directly, the offset between the nearest commercial weather station forecast and local microclimate forecast is predicted. It is believed that hyper-localization of weather station forecasts is more efficient for the predictive program 34 to learn than learning the relationships of the predicted climatic parameter y with the other parameters z and auto-relationship of the y with itself at earlier times. The weather station forecasts for the predicted variable are denoted as $y^-_{t+\ell}$, where $\ell \in [0, L]$ is the future interval from a given time t for which the forecast is recorded. For training purposes, historical weather forecasts and sensor data are used. Therefore, the corresponding recording of the sensor predicted data at time $t+\ell$ is $y_{t+\ell}$. Then, the forecast offset $u_{t+\ell}$ is as follows.

$$u_{t+\ell} = y_{t+\ell} - y^-_{t+\ell}$$

DeepMC predicts $u_{t+\ell}$ using data recorded at and before time t for a retrospective horizon length of L'. The estimate of $u_{t+\ell}$ (denoted as $\hat{u}_{t+\ell}$) alongside the weather forecast, is used to obtain the prediction for the climatic parameter of interest, as follows:

$$\hat{y}_{t+\ell} = y^-_{t+\ell} + \hat{u}_{t+\ell}$$

where $\hat{y}$ is the prediction of y.

Summarizing, the prediction problem takes in IoT sensor historical data ($z_{t-\ell'}$, $y_{t-\ell'}$) and weather station forecasts $\bar{y}_{t+\ell}$ to estimate $y_{t+\ell}$ where the estimate is denoted by $\hat{y}_{t+\ell}$, using an endogenous variable, the forecast offset $u_{t+\ell}$ and its estimate $\hat{u}_{t+\ell}$, where $\ell \in (0, L]$ is the future time interval and $\ell' - [0, L']$ is the retrospective time interval. For convenience, the historical paired data is denoted as ($z_{t-\ell'}$, $y_{t-\ell'}$)=$x_{t-\ell'}$.

4.3 Wavelet Packet Decomposition

Returning now to FIG. 1 illustrating the computing system 10 of the present disclosure, decomposition module 26 of the computing system 10 performs a signal decomposition on the time series of forecast offsets. The time series of forecast offsets is decomposed into a multi-scale data set including at least short scale data and long scale data. The signal decomposition may include wavelet packet decomposition, or alternatively in other configurations other suitable decomposition methods may be utilized.

A specific implementation of signal decomposition by Wavelet Packet Decomposition (WPD) may be achieved as follows. WPD is a classical signal processing method built on wavelet analysis. Wavelet analysis gives an efficient way to decompose time series from the time domain to scale domain. It localizes the change across time within different scales of the original signal. WPD may be used for time series forecasting, by decomposing input signals into combinations of various scales. In one configuration, the multi-scale decomposition via WPD uses low-pass and band-pass filters. Applying this pair of filters to a time series leads to a first order series which contains the trend (i.e., the long scale dynamics), and a second series which contains the details (i.e., the short scale dynamics). The original time series may be reconstructed by summing up the trend and the detail series.

WPD is based on the wavelet analysis. In wavelet analysis, the wavelet transform decomposes the original signal into mutually orthogonal set of wavelets. The discrete wavelet is defined as:

$$\Psi_{j,k}(t) = \frac{1}{\sqrt{s_0^j}} \Psi\left(\frac{t - k\tau_0 s_0^j}{s_0^j}\right),$$

where j and k are integers, $s_0 > 1$ is a fixed dilation step and translation factor, $\tau_0$ depends on the dilation step. The scaling function and wavelet function of the discrete wavelet transform are defined as follows.

$$\Phi(2^j t) = \sum_{i=1}^{k} h_{j+1}(k)\Phi(2^{j+1}(t-k))$$

$$\Psi(2^j t) = \sum_{i=1}^{k} g_{j+1}(k)\Phi(2^{j+1}(t-k))$$

Then the original signal can be reconstructed as follows.

$$x(t) = \sum_{j=1}^{k} \lambda_{j-1}(k)\Phi(2^j t - k) + \sum_{j=1}^{k} \gamma_{j-1}(k)\Psi(2^j t - k)$$

Figure 2:
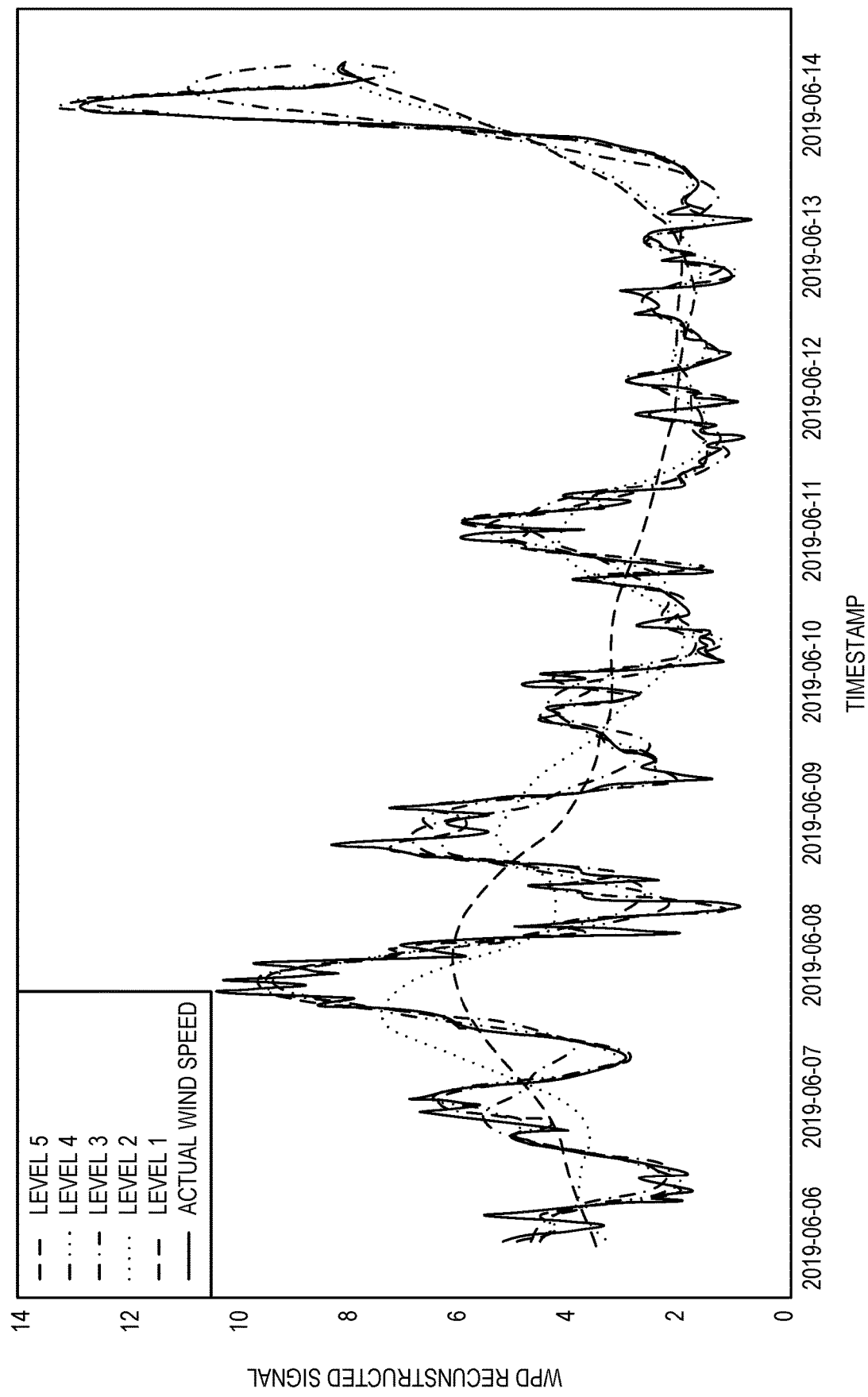
FIG. 2 shows a graph of wind speed signals at various scales using signal decomposition that may be displayed by the predictive program of the computing system of FIG. 1.

Then the time series $x(t) = [x_1, x_2, x_3, \ldots, x_T]$ can be cascaded as:

$$x(t) = A_1(t) + D_1(t)$$
$$= A_2^{A_1}(t) + D_2^{A_1}(t) + A_2^{D_1}(t) + D_2^{D_1}(t)$$
$$= \vdots,$$

where $D_n^*(t)$ and $A_n^*(t)$ are detail and approximation coefficients at level n, respectively. The wavelet W used is Harr wavelet with the corresponding scaling function $\Phi$. An n level wavelet packet decomposition produces $2^n$ different sets of coefficients. FIG. 2 shows the wind speed signal at various scales using wavelet packet decomposition for N=5. Decomposing that signal using WPD gives signals with multiple level of trends and details. In the context of climatic data, this corresponds to variations such as long-term trends, yearly variation, seasonal variation, daily variations, etc. The wavelet packet decomposition for the predictor (x) and error signal (u) are denoted as the sets $w^x = \{w_1^x, \ldots, w_N^x\}$, $w^u = \{w_1^u, \ldots, w_n^u\}$, respectively, where N is the level of decomposition and $w_n^x$, ($n \in [1, N]$) is the reconstructed signal for predictor variable x using N levels of decomposition. The predictor is usually a multidimensional variable, as it contains signals from multiple sensors. For convenience, the multidimensional predictor variable is represented as $x = [x^1, x^2, \ldots, x^S]$, where $x^s$, $s \in S$ is the signal from the $s^{th}$ sensor. Then $w_n^{x^s}$ denotes the reconstructed signal from wavelet packet decomposition at level n for predictor signal $x^s$ for the $s^{th}$ sensor. Therefore $w_n^x$ is the combination of all predictor signals reconstructed from WPD for each predictor sensor signal at level n. This combined with $w_n^u$ is the output of this layer:

$$o_{WPD}^{(n,m)} = w^x \times w_n^u = \{(w_n^x, w_m^x); \forall n, m \in [1, N]\},$$

where × is the cross product. Each element of the output contains all combinations of various scales of the predictor signals x and the error signal u. In order to keep the size of the deep neural network manageable, not all combinations of various signals for each individual predictor sensor signal are generated.

For training, the data is trained as paired variable (x, u), where each paired set consists of $\{x_{t-\ell'}, \ell' \in [0, L]\}$ as the input and $\{u_{t-\ell}, \ell \in (0, L]\}$ as the output.

4.4 Multi Scale Deep Learning

Returning now to FIG. 1, in the computing system 10 of the present disclosure, the multi-scale deep learning module 28 executed by the processor 16 is configured to process the multi-scale data set by inputting the short scale data into a short scale neural network 28C to thereby extract short scale features of the short scale data, and by inputting the long scale data into a long scale neural network 28A to thereby extract long scale features of the long scale data, at each time step in the time series.

The multi-scale data set may further include medium scale data, and the multi-scale deep learning module 28 of the computing system 10 may process the multi-scale data set further includes inputting the medium scale data into a medium scale neural network 28B to thereby extract medium scale features the medium scale data, at each time step in the time series.

Continuing with FIG. 1, the computing system 10 may be configured such that the short scale neural network 28C includes a first multi-layered convolutional neural network (CNN) stack including a plurality of serially linked convolutional neural networks 28C1-3, the one or more medium scale neural networks 28B include a second multi-layered convolutional neural network (CNN) stack including a plurality of serially linked convolutional neural networks 28B1-3, and the long scale neural network 28A includes one or more (i.e., in some cases a plurality) of convolutional neural networks 28A1, 28A2 and long short term memory (CNN-LSTM) stack in which a convolutional neural network is serially linked to a long short term memory neural network 28A3.

Figure 11:
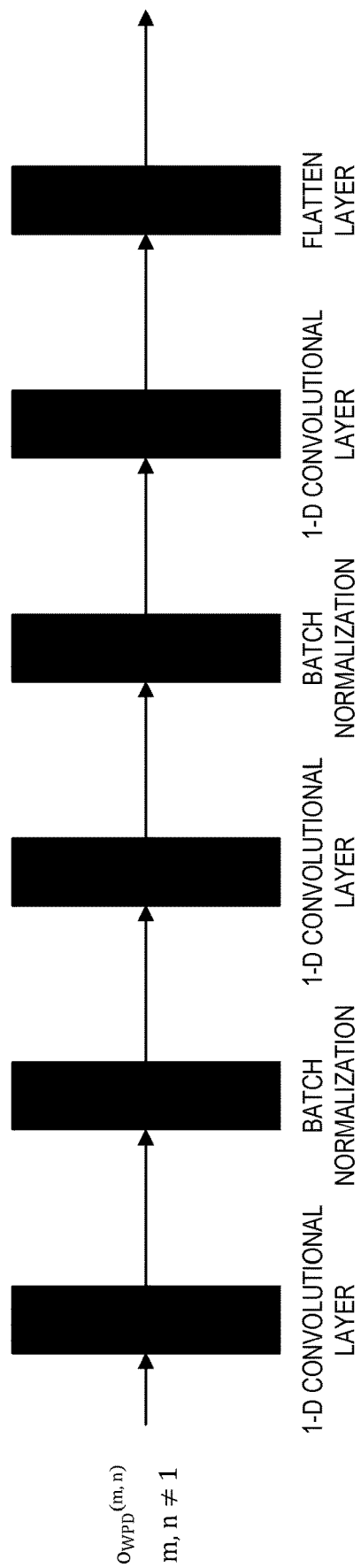
FIG. 11 schematically shows a CNN stack according to one example, which may be used in the encoder of the computing system of FIG. 1.
Figure 12:
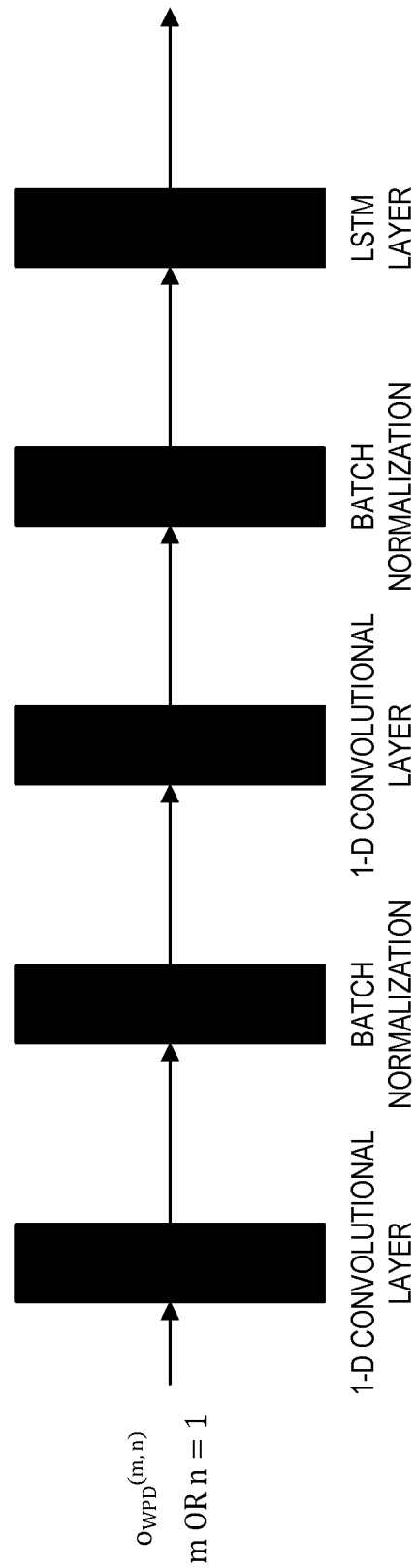
FIG. 12 schematically shows a CNN-LSTM stack according to one example, which may be used in the encoder of the computing system of FIG. 1.

According to a specific implementation of the present disclosure, the multi-scale data set may be processed as follows. Once the output data is prepared from WPD in the previous step $o_{WPD}^{(n,m)}$(n,m=[1, N], this data is the input data for the deep learning network. The data is separated into long scale (n or m=1), medium scale (n, m∈[2, N−1]) and short scale (n or m=N) signals. The long scale signals pass through a CNN-LSTM stack. The CNN-LSTM stack used is shown in FIG. 12. The medium scale and the short scale signals pass through a multi-layered CNN stack, shown in FIG. 11. For the data with short-term dependencies (medium and short scale data), the CNN layer has similar performance and faster computing speed when compared to the LSTM recurrent layer, thus CNN layers are used for the medium and short scale data. While, for the long scale data, the CNN layers extract the deep features of the time series and the LSTM layer sequentially process the temporal data with long-term and short-term dependence. Therefore CNN-LSTM architecture is used for long scale data.

This design choice achieved superior performance compared across predictions of all climatic parameters under consideration by the DeepMC implementation of computer system 10. The heuristic on choosing CNNs for short and medium scale (n, m∈[2, N−1]) while CNN-LSTM for long scale data (m or n=1) enables generalization of DeepMC across varying dimension of the input considered. More details are in Section 8, below.

4.5 Attention Mechanism

Figure 3:
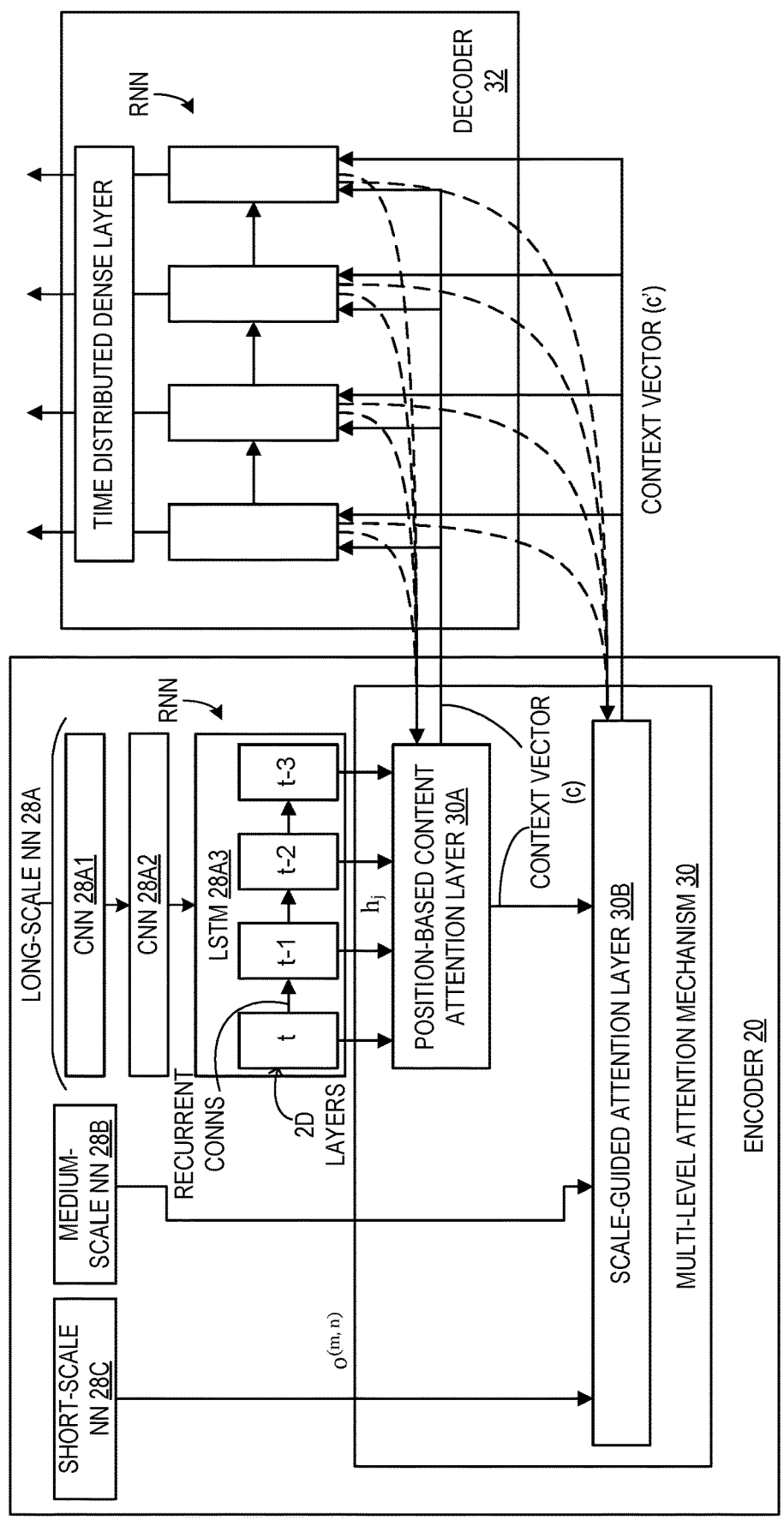
FIG. 3 schematically shows a two-level attention mechanism implemented in an encoder and communicating with a decoder, according to the computing system of FIG. 1.

Returning now to the computing system of the present disclosure, FIG. 3 depicts the encoder 20 and the decoder 32 in greater detail. The computing system 10 applies the attention mechanism 30, having at least two attention levels, to the extracted short scale features and long scale features, the two attention levels including a position-based content attention layer 30A and a scale-guided attention layer 30B, to generate respective short scale and long scale context vectors, at each time step in the time series. The LSTM 28A3 comprises a plurality of interconnected 2D layers, which form a three-dimensional recurrent neural network (RNN) with LSTM functionality. Each 2D layer represents a slice of the neural network at a particular position in time, which has been fed input data from a particular time in the time series. Recurrent connections between the 2D layers connect nodes in each 2D layer to corresponding nodes in 2D layers in prior time steps, thereby enabling the current time step to be affected by weighted connections to prior time steps. By examining the output of the each 2D layer at each time step, the position-based content attention layer 30A can evaluate signals based on the position in time of the signals, which enables it to be able to pick up on signals that occur over time. Context vector c, being output from the position-based content attention layer 30A, is inputted into scale-guided attention layer 30B and a multi-layer RNN of the decoder 32.

In a specific implementation of the computing system of the present disclosure, the multi-level attention mechanism 30 may be applied as follows. DeepMC uses two levels of attention models. The first level attention model is a long-range guided attention model that is used with the CNN-LSTM output, and it memorizes the long-term dynamics of the input time series. Various attention models may be used in direct sequence-to-sequence RNNs to capture memory of the input sequence (or time series representation) and pseudo-periods within the time series. DeepMC uses a position-based content attention model for this level, and in particular a multivariate version of the positioned-based content attention model. For brevity, notations specifying each individual feature vector in the formulation below are omitted. The LSTM in the CNN-LSTM encoder stack represents each input $l_i$, $1 \leq i \leq T$ as a hidden state: $h_i = F(l_i, h_{i-i})$ with $h_i \in R^H$ and where the function F is a non-linear transformation corresponding to the LSTM layers and H is the dimension of the hidden layer. The LSTM decoder (described in Section 4.6) parallels the encoder by associating each output $m_i$, $1 \leq i \leq T'$ to a hidden state vector si that is directly used to predict the output:

$$m_i = G(m_{i-1}, s_{i-1}, c_i),$$

with $s_i \in R^{H'}$, H' is the dimension of the decoder hidden layer, $c_i$ is usually referred to as a context and corresponds to the output of the memory model. For DeepMC the function G corresponds to an LSTM with a context integration. Using these notations the long-range guided attention model based on the position based content attention mechanism is formulated as RNN-$\pi^{(2)}$ as follows.

$$RNN - \pi^{(2)}: \begin{cases} e_{ij} = v_a^T \tanh(W_a s_{i-1} + U_a((\pi^{(2)} \Delta^{i,j}) \odot h_j)) \Delta_{i+T-j} \\ \alpha_{ij} = softmax(e_{ij}), c_i = \sum_{j=1}^{T} \alpha_{ij} h_j \end{cases},$$

where $W_a, U_a, \pi \in R^{2H \times (T+T')}$ and $v_a$ are trained in conjunction with the entire DeepMC deep learning architecture, $\Delta^{(i,j)} \in R^T$ is a binary vector that is 1 on dimension (i+T−j) and 0 elsewhere, $\odot$ denotes the element wise multiplication (Hadamard product) and $\Delta \in R^{T+T'}$ has 1 on its first T coordinates and 0 on the last T'.

The second level attention model is a scale guided attention model and is used to capture the respective weighting of different scales. The scale guided attention model uses an additive attention mechanism described here. The outputs of the multi-scale model (including the output of the long-range guided attention mechanism on the CNN-LSTM stack) is represented as $o^{(m,n)}$, m, n∈ [1, N]. For convenience a single index j for the tuple (m, n) is introduced. Then the attention mechanism context vector $c_i'$ is defined as:

$$c_i' = \sum_j^{N^2} \alpha_{ij}' o^{(j)}.$$

The weight $\alpha_{ij}'$ of each output $o^{(j)}$ is computed by:

$$\alpha_{ij}' = \frac{\exp(e_{ij})}{\sum_{k=1}^{N^2} e_{ik}},$$

where $e_{ij} = \tanh(w_{i,j}'^T(s_{i-1}; o^{(j)}))$, $w_{i,j}'$, i∈[1, T']; j∈[1, N²] is trained in conjunction with the entire DeepMC deep learning architecture.

4.6 Decoder

Returning now to FIG. 3. of the present disclosure, the computing system 10 performs a decoder computation in which the decoder 32 receives the respective short scale and long scale context vectors and computes a predicted forecast offset, at each time step in the time series. The decoder is configured with an LSTM layer configured to perform the decoder computation.

In a specific implementation of the computer system 10, the decoder 32 may be configured as shown in FIG. 1 and is described as follows. The DeepMC decoder 32 uses LSTM to generate a sequence of L outputs, which is equal to the number of future timesteps to be predicted. The decoder LSTM layer receives a multivariate encoded time series and produces a vector for each step of prediction. The outputs of the LSTM are sent through each of the two fully connected time distributed layers.

5. TRANSFER LEARNING USING GAN

Figure 4:
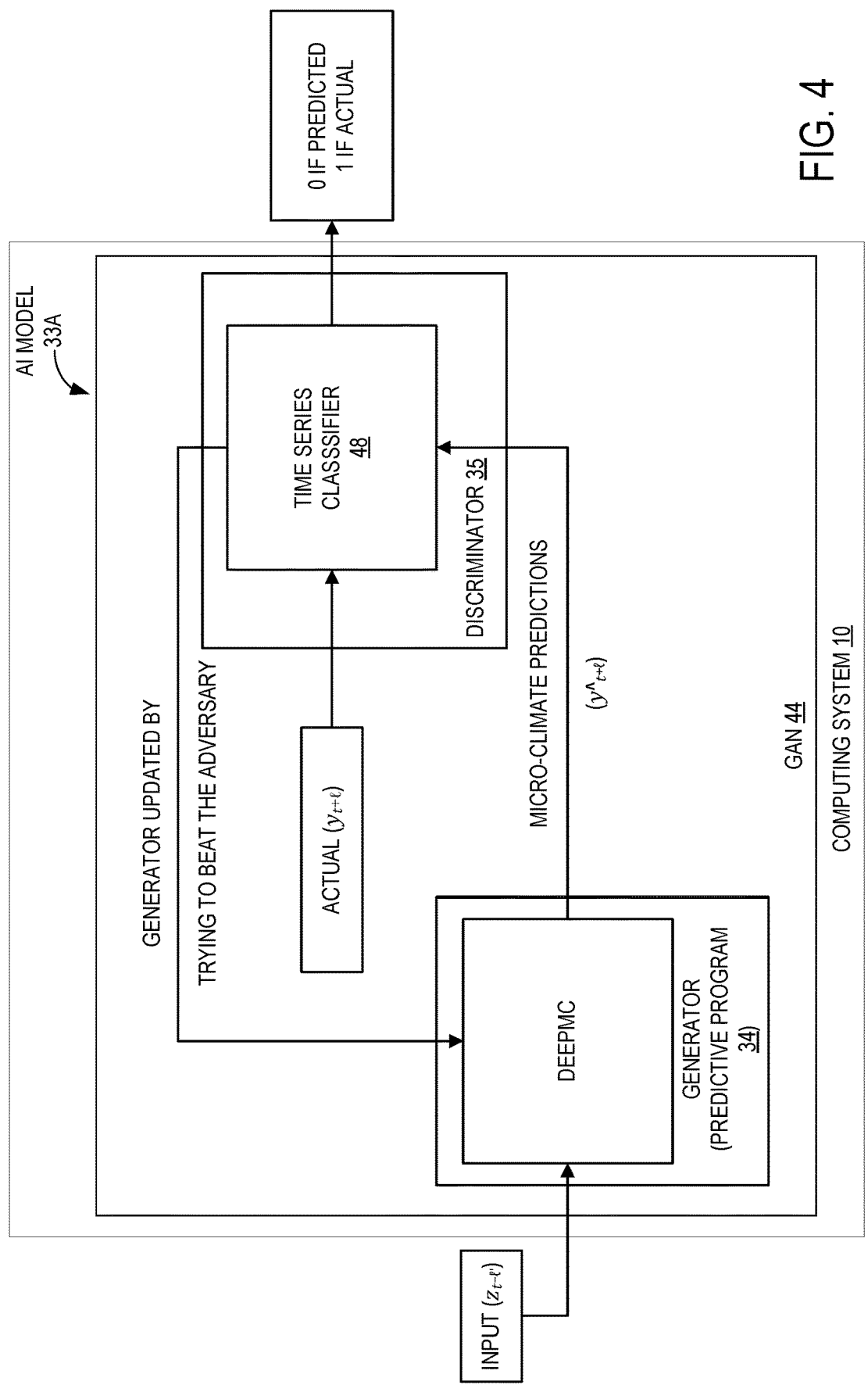
FIG. 4 schematically illustrates a generative adversarial network (GAN) architecture for transfer learning to train the predictive program of the computing system of FIG. 1.

Turning now to FIG. 4 of the present disclosure, in one embodiment of the computing system 10, the processor 16 is further configured to execute AI model 33A which includes GAN 44, within which the predictive program 34 serves as a generator of the GAN 44. The instructions further include a binary time series classifier 48 that serves as a discriminator of the GAN 44. The generator generates a first batch of training data for the discriminator 35 including forecast offsets and associated predicted forecast offsets based thereon. The discriminator 35 receives the first batch of training data and is trained to discriminate between the forecast offsets and predicted forecast offsets in the first batch of training data. The generator generates a second batch of training data including forecast offsets and associated predicted forecast offsets based thereon, and the multilevel attention mechanism of the predictive program 34 of the generator is updated while the generator is pitted against the discriminator 35. The discriminator 35 may be trained using binary cross entropy with adapted moment estimation optimization, or other suitable methods.

In a specific implementation of the present disclosure, the GAN 44 may be configured as follows. DeepMC uses GAN to transfer models learned on one domain to sensors where a sufficient paired labelled dataset is not available. In the context of microclimate time series data, the generator is the microclimate predictor, while the discriminator is a binary time series classifier, which discriminates between the predicted microclimate parameter ($\hat{y}_{t+\ell}$) and actual observations ($y_{t+\ell}$). The generator is constructed as the embodiment of FIG. 1 describe above, the discriminator may take a variety of forms, such as the InceptionTime model of Fawaz et al. FIG. 4 shows the GAN architecture used for transfer learning. Further details and results obtained are presented in Section 9 below.

While the above specific implementation addresses microclimate predictions, it will be appreciated that other implementations of the present disclosure may be unrelated to climate. The computer system 10 may be configured to make predictions in any field in which both a regional forecast based on a time series data indicative of the value of a parameter as measured at a remote location is available and a need exists for a local forecast of the parameter based on time series data for a local location and based on the regional forecast. For example, in another specific implementation, the regional forecast may be a macroeconomic or production variable such as retail sales, the local data may be point-of-sale (PoS) data from a particular store or register within a store, and the prediction may be of hyperlocal demand for the particular store or region of a store. These techniques may also be applied to gross domestic product, wages, taxes, or other series of economic parameters.

Figure 16:
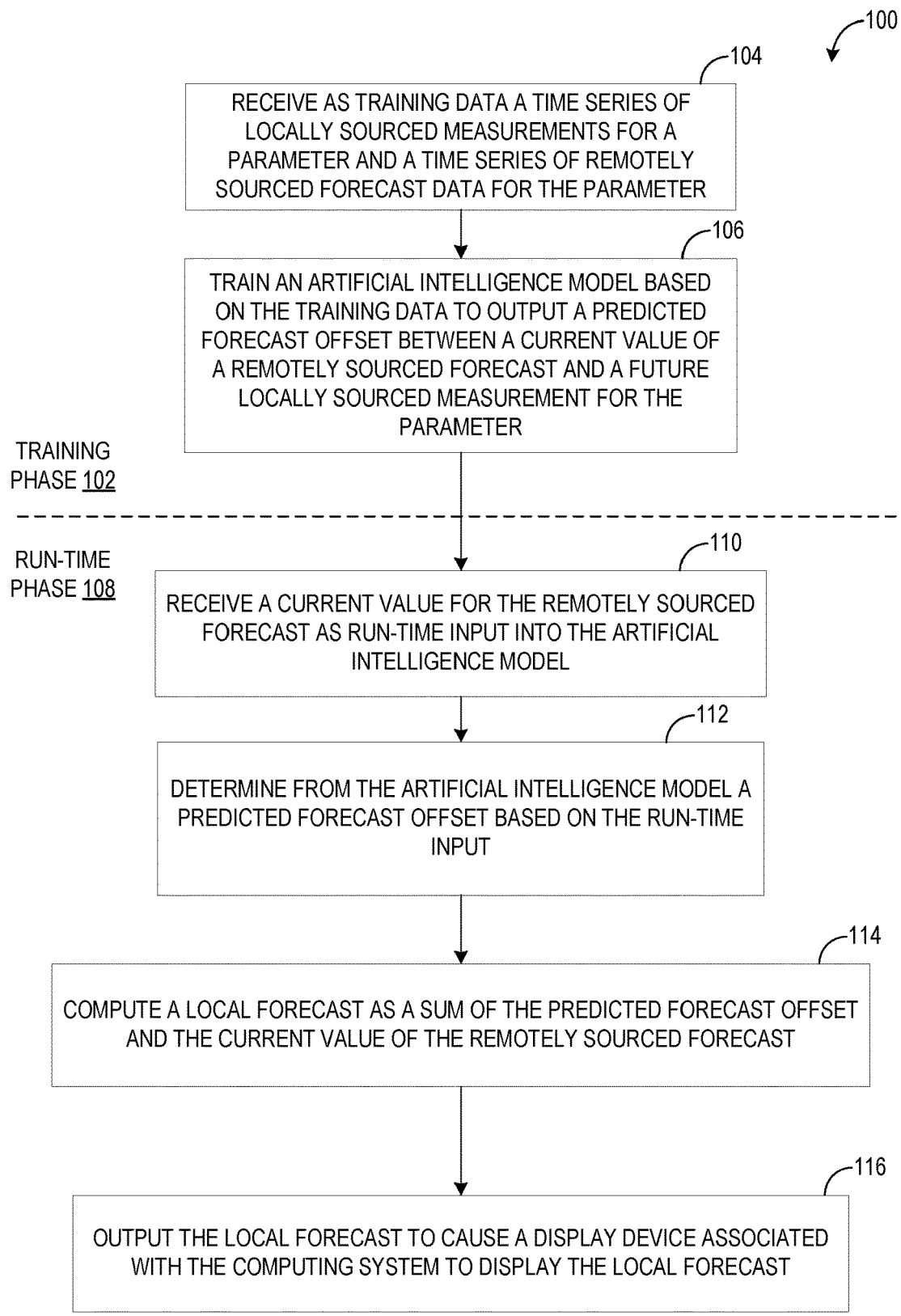
FIG. 16 illustrates a flowchart of a method, according to one embodiment of the present disclosure.

Turning now to FIG. 16, a method 100 for predicting and outputting forecast offsets will now be described. It will be appreciated that the method 100 may be implemented using the above described computer system 10, or other suitable hardware and software componentry.

A method 100 for predicting and displaying a local forecast is provided. As illustrated at 102, the method in one embodiment comprises, via processing circuitry, a training phase. The training phase 102 comprises at 104 receiving as training data a time series of locally sourced measurements for a parameter and a time series of remotely sourced forecast data for the parameter. In one example, the locally sourced measurements may be obtained from local sensor 36 of computing system 10 as described above. At 106, the training phase further comprises training an artificial intelligence model based on the training data to output a predicted forecast offset between a current value of a remotely sourced forecast and a future locally sourced measurement for the parameter. The artificial intelligence model may be artificial intelligence model 33 described above, which is included in the predictive program 34 as a generator and a discriminator 35. Training may be accomplished by the generative adversarial network methods described above with reference to FIG. 4, or other suitable methods. The remotely sourced forecast may be received from forecast source 38 described above. The method further comprises a run-time phase 108. At 110 the run-time phase comprises receiving a current value for the remotely sourced forecast as run-time input into the artificial intelligence model. The current value of the remotely sourced forecast may for example be received from forecast source 38 and be based on readings from sensor 40. At 112, the run-time phase further comprises determining from the artificial intelligence model a predicted forecast offset based on the run-time input. At 114, the run-time phase further comprises computing a local forecast as a sum of the predicted forecast offset and the current value of the remotely sourced forecast. The predicted forecast offset may be computed as described above. At 116, the run-time phase further comprises outputting the local forecast to cause a display device associated with the computing system to display the local forecast.

Figure 17:
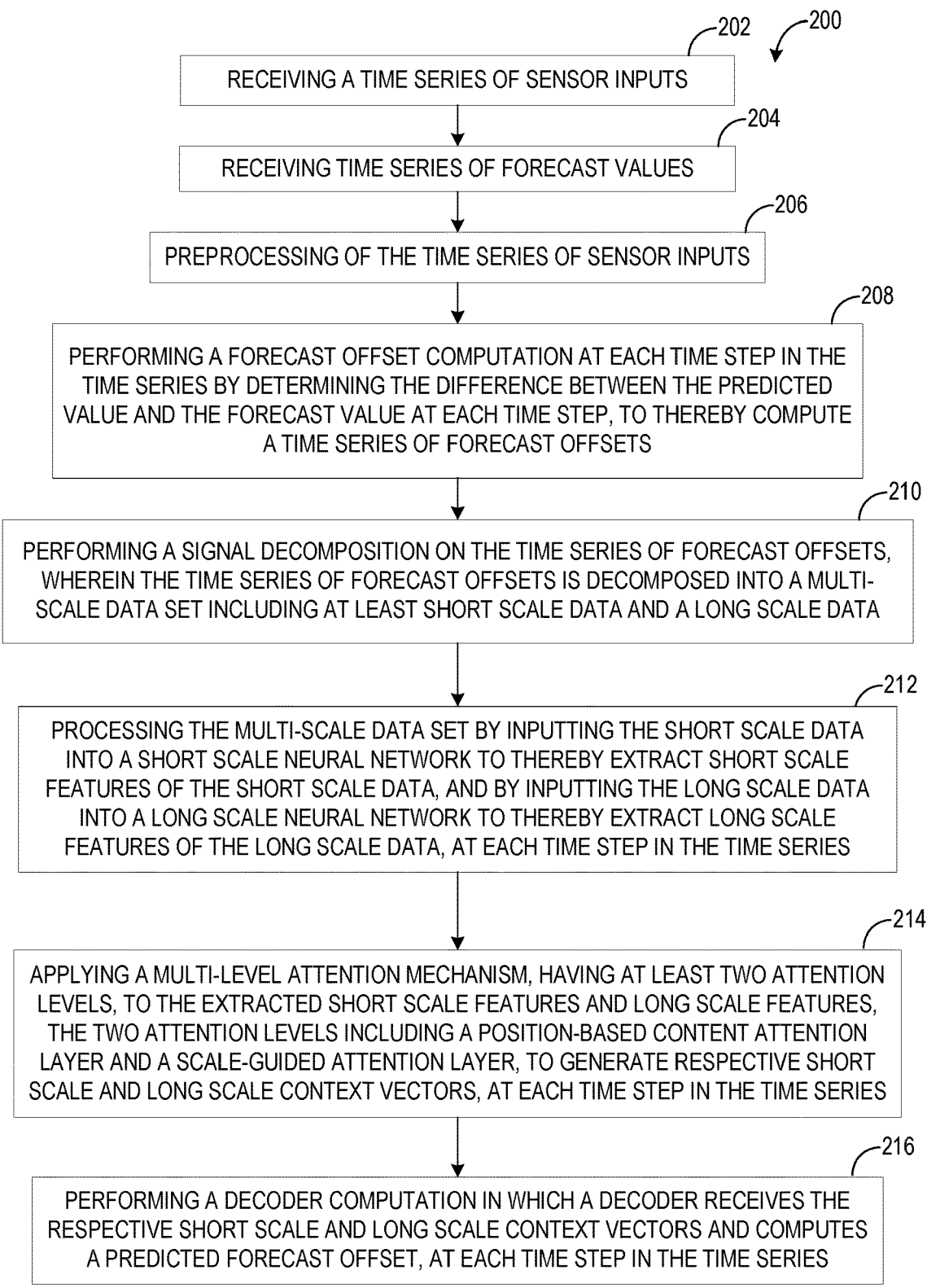
FIG. 17 illustrates a flowchart of a method, according to another embodiment of the present disclosure.

Turning now to FIG. 17, a method 200 for predicting forecast offsets according to one embodiment of the present disclosure will now be described. It will be appreciated that the method 200 may be implemented using the above described computer system 10, or other suitable hardware and software componentry.

A method 200 for predicting a forecast offset is provided. As illustrated at 202, the method in one embodiment comprises, via processing circuitry, receiving from a local sensor a time series of sensor inputs indicating respective measured values of a parameter over a time period, the sensor being geolocated in a first location. At 204, the method further comprises receiving time series of forecast values for the parameter from a forecast source, the forecast values having been computed based on data from sensors that are geographically remote from the first location. At 206, the method further comprises performing preprocessing of the time series of sensor inputs using a predictive model to thereby compute a predicted value for the parameter for at each successive time step in the time series. At 208, the method further comprises performing a forecast offset computation at each time step in the time series by determining the difference between the predicted value and the forecast value at each time step, to thereby compute a time series of forecast offsets. At 210, the method further comprises performing a signal decomposition on the time series of forecast offsets. The time series of forecast offsets is decomposed into a multi-scale data set including at least short scale data and long scale data. At 212, the method further comprises processing the multi-scale data set by inputting the short scale data into a short scale neural network to thereby extract short scale features of the short scale data, and by inputting the long scale data into a long scale neural network to thereby extract long scale features of the long scale data, at each time step in the time series.

At 214, the method further comprises applying a multi-level attention mechanism, having at least two attention levels, to the extracted short scale features and long scale features, the two attention levels including a position-based content attention layer and a scale-guided attention layer, to generate respective short scale and long scale context vectors, at each time step in the time series.

At 216, the method further comprises performing a decoder computation in which a decoder receives the respective short scale and long scale context vectors and computes a predicted forecast offset, at each time step in the time series. It will be appreciated that steps 204 and 206 are one example implementation of step 110 of method 100, and that steps 208-216 are one example implementation of step 112 of method 100.

In one aspect, the parameter may be a climatic parameter, the forecast source may be weather station, and the predicted forecast offset may be a predicted weather forecast offset for the climatic parameter.

In another aspect, the preprocessing may be performed using an autoregressive integrated moving average model.

In another aspect, the signal decomposition may include wavelet packet decomposition.

In yet another aspect, the short scale neural network may include a multi-layered convolutional neural network (CNN) stack including a plurality of serially linked convolutional neural networks, and the long scale neural network may include a convolutional neural network and long short term memory (CNN-LSTM) stack in which a convolutional neural network is serially linked to a long short term memory neural network.

In another aspect, the multi-scale data set may further include medium scale data; and processing the multi-scale data set may further include inputting the medium scale data into a medium scale neural network to thereby extract medium scale features the medium scale data, at each time step in the time series.

In another aspect, the short scale neural network may include a first multi-layered convolutional neural network (CNN) stack including a plurality of serially linked convolutional neural networks. The one or more medium scale neural networks may include a second multi-layered convolutional neural network (CNN) stack including a plurality of serially linked convolutional neural networks. The long scale neural network may include a convolutional neural network and long short term memory (CNN-LSTM) stack in which a convolutional neural network is serially linked to a long short term memory neural network.

In another aspect, the decoder may be configured with an LSTM layer configured to perform the decoder computation.

It will be appreciated that the processing circuitry may be further configured to execute a generative adversarial network (GAN). The predictive program may serve as a generator of the GAN. The instructions may further include a binary time series classifier that serves as a discriminator of the GAN. The generator may generate a first batch of training data for the discriminator including forecast offsets and associated predicted forecast offsets based thereon. The discriminator may receive the first batch of training data and may be trained to discriminate between the forecast offsets and predicted forecast offsets in the first batch of training data. The generator may generate a second batch of training data including forecast offsets and associated predicted forecast offsets based thereon. The multi-level attention mechanism of the predictive program of the generator may be updated while the generator is pitted against the discriminator.

6. APPLICATIONS

Three applications of the above described systems and methods are described below.

6.1 Fertilization: Micro-Temperature Predictions

Figure 5:
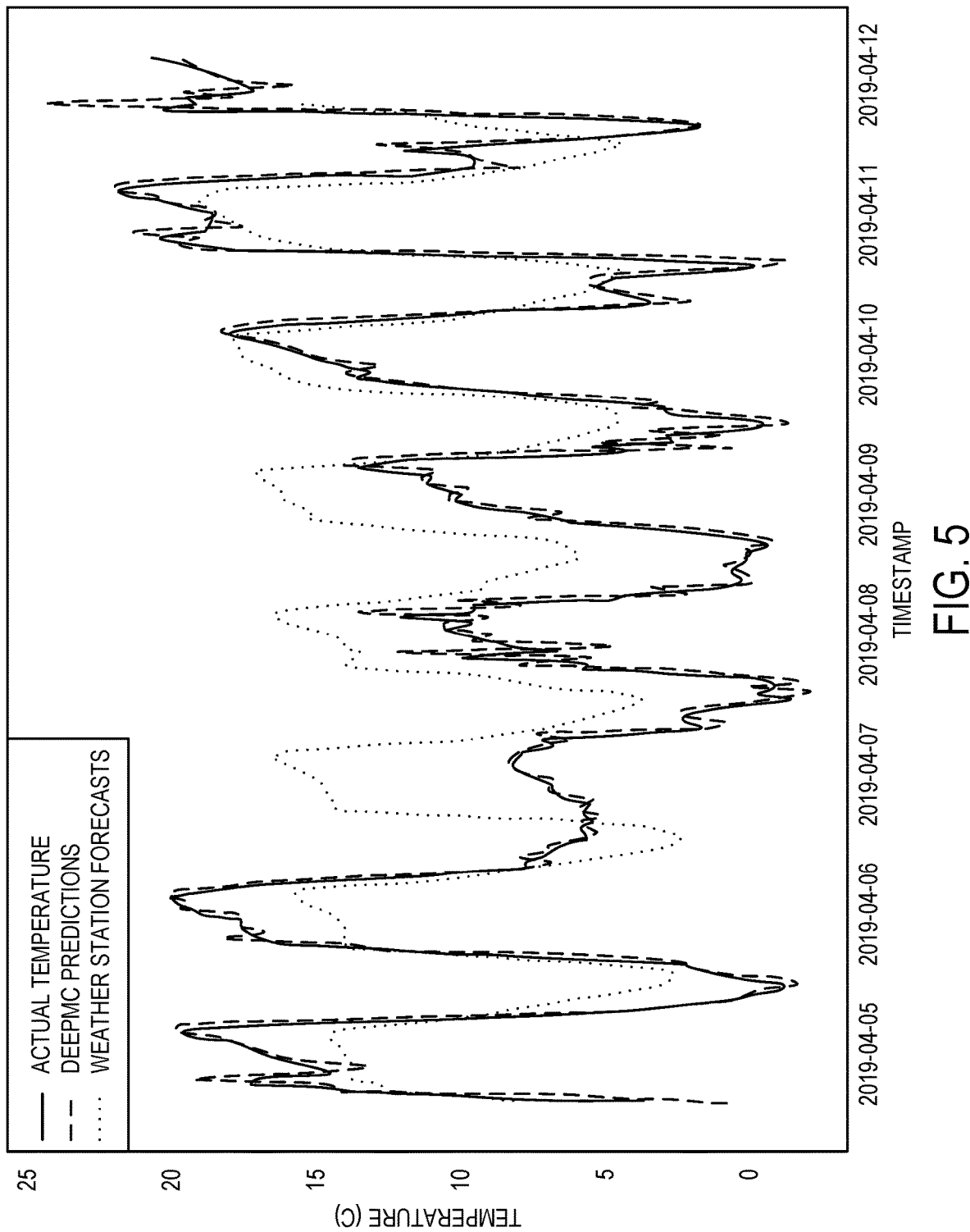
FIG. 5 shows a graph of six-day sequential predictions of microclimate temperature with a resolution of six hours, as computed by the computing system of FIG. 1.

Continuing the Example Scenario discussed far above, the computer system 10 has been experimentally deployed on a farm of approximately 9000 acres of land across a region which is hilly. There are many distinct microclimate regions in this farm. Climatic parameters vary significantly among various regions of the farm and also between the nearest commercial weather forecast provider and the readings on the ground. The farmer uses DeepMC predictions for advisory on temperature forecasts at specific locations on his farm. In this scenario, the farmer consults DeepMC for temperature predictions for specific locations to plan logistics and operations for fertilization. FIG. 5 shows a 6-day forecast with a temporal resolution of 6 hours. FIG. 5 shows the comparison of the results obtained by DeepMC with Dark Sky weather forecast (from the nearest station) and the actual temperatures recorded using IoT sensors in retrospect. Based on DeepMC's experimental predictions the farmer postponed his fertilization for the period between 7 Apr. 2019 to 11 Apr. 2019 as the temperature predicted by DeepMC were below freezing. Instead, had the farmer relied on weather station forecasts, which consistently showed temperatures above freezing (more than 5° C.), then he would have been at risk of endangering the crop losing up to 20% in yield. In many places, especially small farms, this percentage is significant enough to decide whether the farmers will be able to achieve basic sustenance of food and supplies in the coming year. For this particular farm and location, DeepMC has recorded predictions for ambient temperature with a RMSE of 1.35 and MAPE of 7.68% (implying accuracy of 92.32%), for the data recorded in FIG. 5. The predictors used for predicting micro-temperature are: (a) from the IoT sensors—ambient temperature, ambient humidity, precipitation, and wind speed; and (b) from the weather station—historical ambient temperature forecasts. The DeepMC design choice described in Section 4.4 above allows the DeepMC architecture to adapt itself to this input-output pairing without any changes to the architecture itself.

6.2 Phenotyping Research: Micro-Soil-Moisture Predictions

In this experimental example, a producer is interested in experimenting with different growing techniques for vine tomatoes. The vine tomatoes are susceptible to rot if they are too close to soil with high moisture values. Generally, producers use trellises to lift up the vines and provide structural stability. The trellises add more challenges to manage the crops over the growing season. The producer here is interested in growing tomatoes without the trellises.

Figure 6:
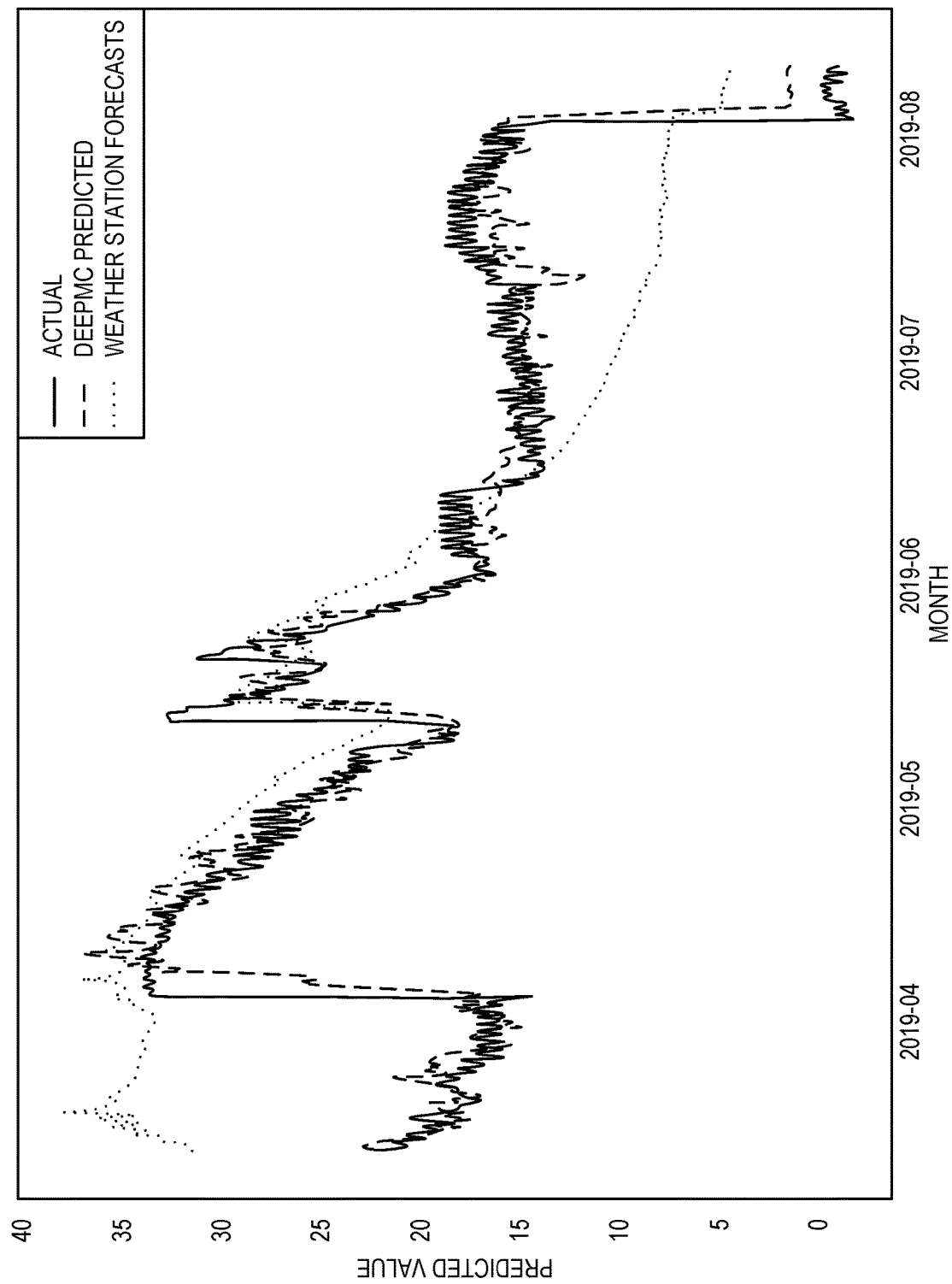
FIG. 6 shows a graph of fourth day predictions of microclimate soil moisture with six-hour resolution over a period of ten months, as computed by the computing system of FIG. 1.

This depends on being able to predict the local soil moisture values accurately. The producer uses DeepMC for advisory on micro-soil-moisture conditions. The results are shown in FIG. 6 with the recorded RMSE value of 3.11 and MAPE value of 14.03% (implying a 85.97% accuracy). The predictors used for predicting micro-soil-moisture are; (a) from the IoT sensors—ambient temperature, ambient humidity, precipitation, wind speed, soil moisture and soil temperature; (b) from the weather station—historical soil moisture forecasts.

6.3 Greenhouse Control; Micro-Humidity Predictions

Figure 7:
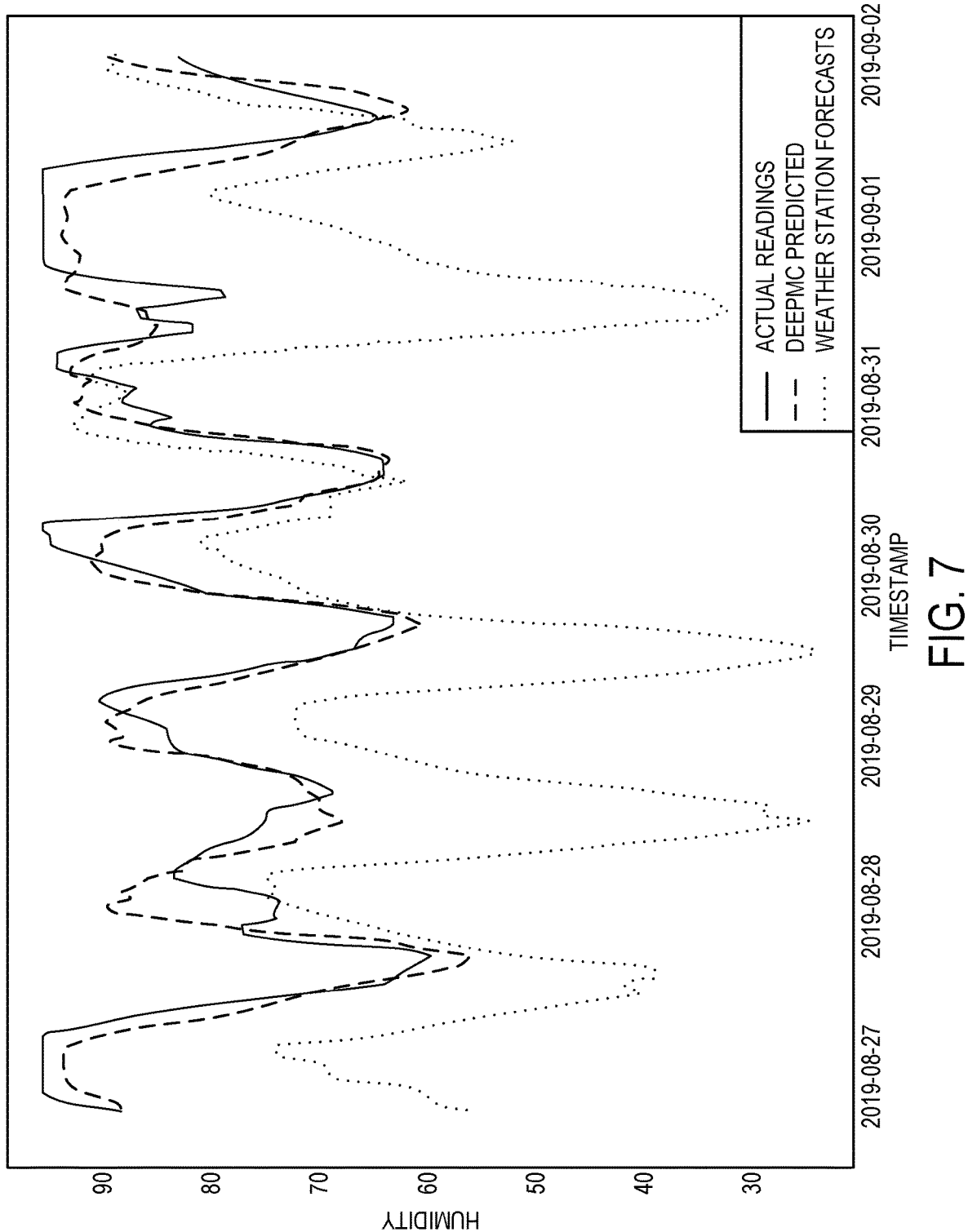
FIG. 7 shows a graph of microclimate humidity predictions at the 12th hour with a resolution of one hour over a one-week period, as computed by the computing system of FIG. 1.

In this example experimental scenario, the producer is growing garbanzo beans inside a greenhouse. In order to control climate conditions inside the greenhouse, the producer uses fans which pull the air from outside to regulate temperatures inside the greenhouse. A speed and duration of the fan control depend on the immediate humidity levels in air outside the greenhouse. The producer consults DeepMC to advise in the decision making of greenhouse fan control. Results are shown in FIG. 7. Predictions are plotted for the 12th hour over a period of one week with a resolution of one hour. The RMSE recorded for these predictions is 5.54 and MAPE is 5.09% (therefore, the MAPE accuracy recorded is 100%-5.09%=94.91%). The model was trained on a stock dataset from a different farm where sufficient paired data was available and transferred to this location. Predictors used for predicting micro-humidity are; (a) from the IoT sensors —ambient temperature, ambient humidity, precipitation, wind speed; (b) from the weather station—historical ambient humidity forecasts.

6.4 Additional Results

Figure 8:
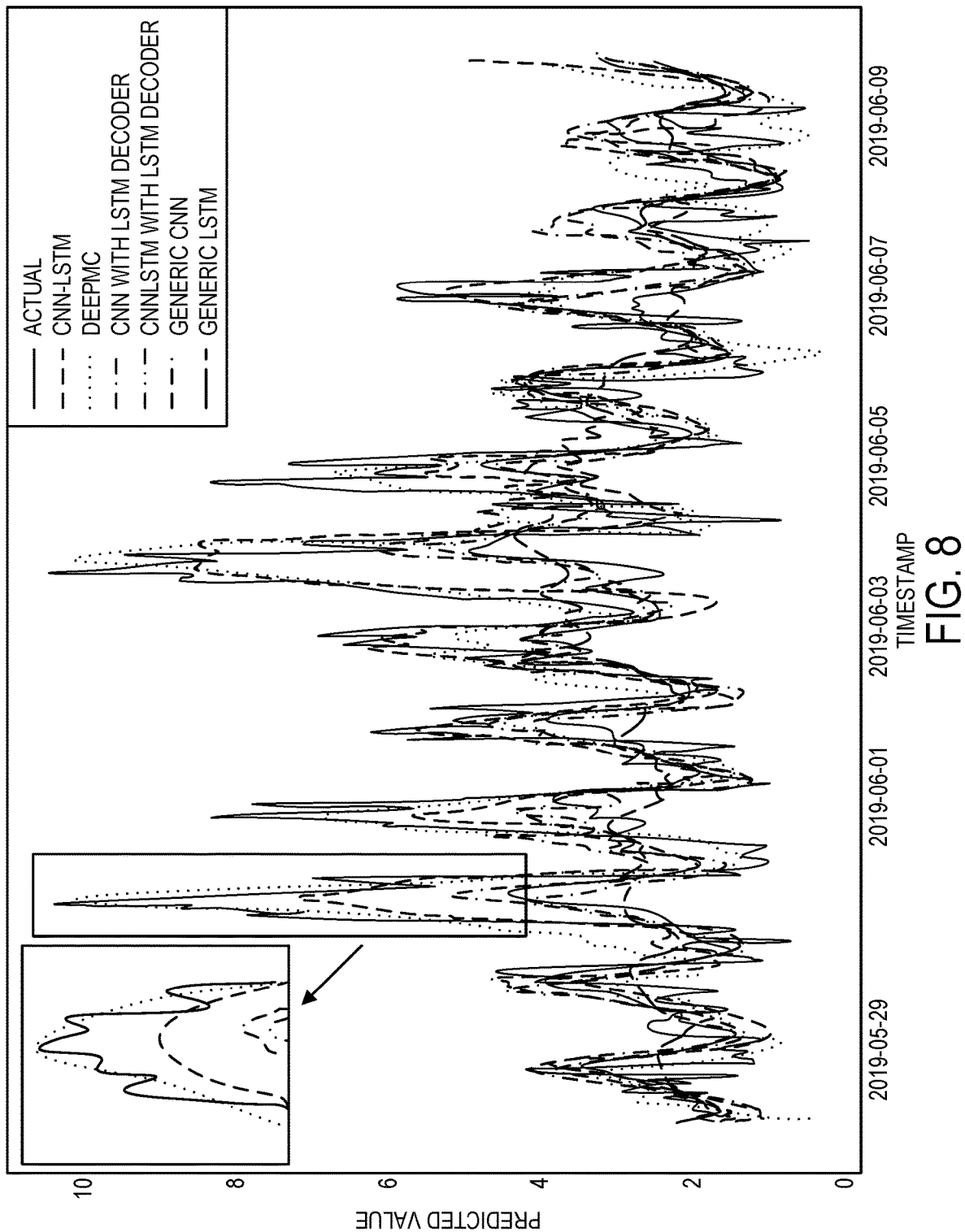
FIG. 8 shows a graph of microclimate wind speed prediction comparisons at the 24th hour with a resolution of one hour over a ten-day period, as computed by the computing system of FIG. 1.
Figure 9:
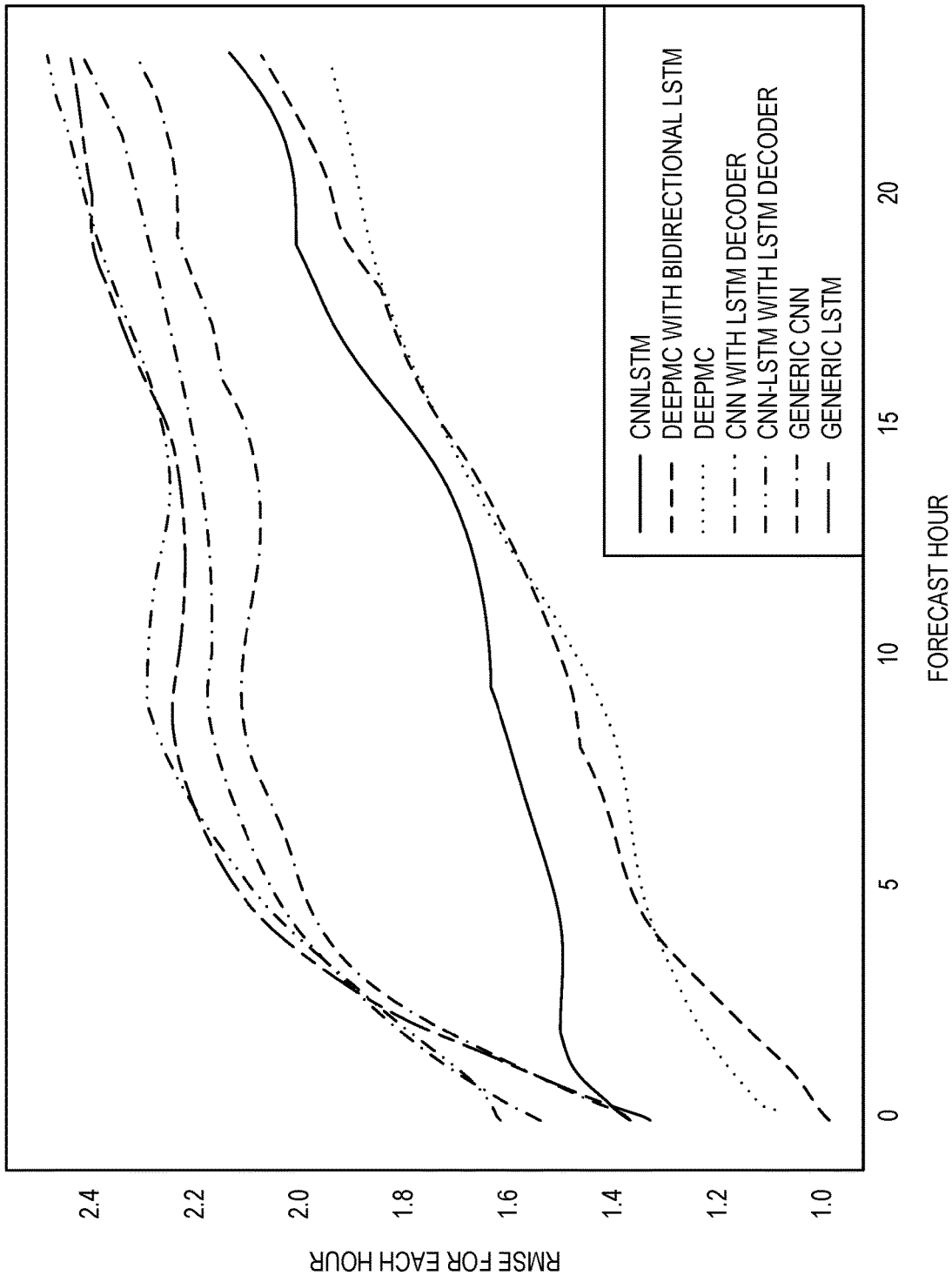
FIG. 9 shows a graph of microclimate wind speed prediction root mean squared error (RMSE) comparisons over 24-hour prediction windows, as computed by the computing system of FIG. 1.
Figure 10:
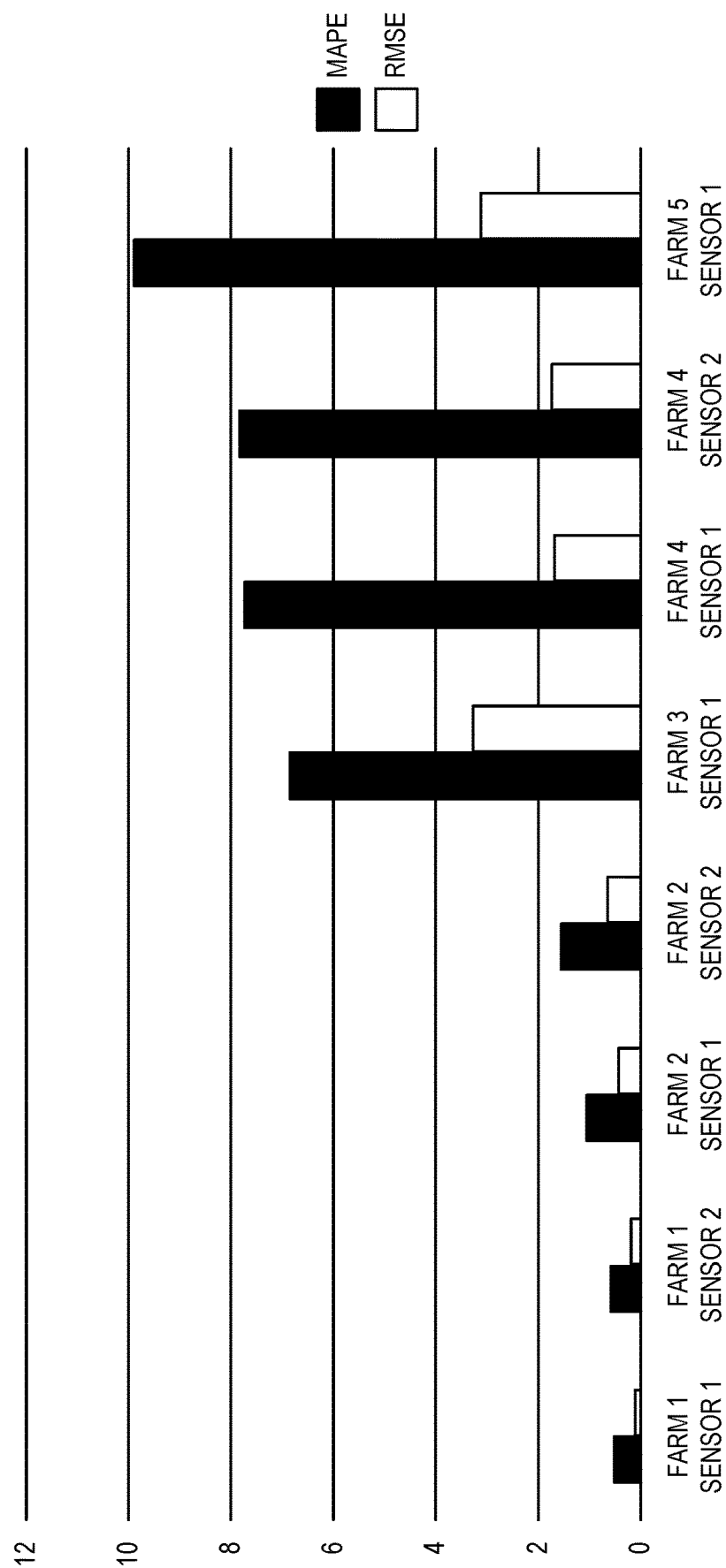
FIG. 10 shows a graph of RMSE and mean average percentage error (MADE) scores for soil moisture predictions over various farms and sensors, as computed by the computing system of FIG. 1.

DeepMC is compared with other deep learning architectures and forecasting techniques across wide variety of climatic parameters. FIG. 8 shows the wind speed predictions at the 24th hour over a period of 10 days with one-hour resolution. FIG. 9 plots the RMSE for each hour prediction and compares with other models. It is observed that DeepMC has significantly better performance compared to other models and is more likely to follow the details and trends of the time series data. Other models used for comparison (in this case for Wind Speed) are a CNN-LSTM model, a modified CNN-LSTM with LSTM decoder, a regular convolutional network with LSTM decoder, a generic LSTM based forecaster, and a generic CNN based forecaster. It will be appreciated that the performance of all models decreases as the horizon of prediction increases, which is to be expected as it is more accurate to predict the next immediate hour vs. a forecast on the 24th hour. FIG. 10 plots the RMSE and MAPE values for DeepMC soil moisture predictions using a model trained on one dataset and transferred across different farms and sensors where there is insufficient data from historical paired labelled datasets. The model is observed to consistently achieve 90%+ accuracy on direct prediction tasks and 85%+ accuracy after transfer learning.

7. DISCUSSION, RESOURCES FOR REPRODUCABILITY, AND CONCLUSION

Section 8 provides various implementation details to experiment and build upon the microclimate prediction framework disclosed herein. The supplementary material in Section 8 also presents some results which are based on open source datasets which can simulate a real-world scenario similar to those presented above in Section 6. DeepMC is observed to achieve compelling results on multiple microclimate prediction tasks and also after transferring models learned on one domain to another.

8. DEEPMC IMPLEMENTATION DETAILS

This section describes some of the implementation details of the specific DeepMC architecture.

A.1 Preprocessing of Sensor Data

As mentioned in Section 4.1, ARIMA forecasting model is used to fill in missing data. The python module statsmodels7 is used with parameter values: Number of time lags of the autoregressive model, p=5; Degree of differencing, d=1 and; Order of the moving-average model, q=0.

A.2 Forecast Offset Computation

Using the notations defined in Section 4.2 various values for L and L' are used depending on the problem of interest. Typically L'≥L and in the range of L, L' ~24 which can signify a 24 hour retrospective and predictive interval with one-hour resolution or three-day retrospective and predictive interval with six-hour resolution or any such combination.

A.3 Wavelet Packet Decomposition

Wavelet Packet Decomposition is described in Section 4.3. A 5-level decomposition using Haar wavelet function is used.

A.4 Multi Scale Deep Learning

The architecture described in FIG. 1 and in Section 4.4 contains a CNN stack and a CNN-LSTM stack. The CNN stack (FIG. 11) uses three 1-D convolutional layers with filter sizes of four and ReLU activation function for each layer. Each layer is batch normalized before passing onto the next layer. The last layer flattens the output. The CNN-LSTM (FIG. 12) stack uses two 1-D convolutional layers with filter sizes of four and ReLU activation function for each layer. Each layer is batch normalized before passing onto the next layer. The output of the last layer is passed through a LSTM layer with ReLU activation function and dropout rate of 20%. The convolutional layers use a He Normal Initialization.

A.5 Decoder

The decoder described in Section 4.6 uses a 20 node LSTM layer with ReLU activation function. Additionally, the decoder also uses ReLU activation for a first dense layer and a linear activation function for a second dense layer. The first dense layer has 50 nodes for each of the time series step and the second dense layer has 1 node for each of the time series step.

The entire model, as summarized in FIG. 1, is trained using the mean squared loss function with Adam optimizer.

9. DETAILS OF GAN FOR TRANSFER LEARNING

Figure 13:
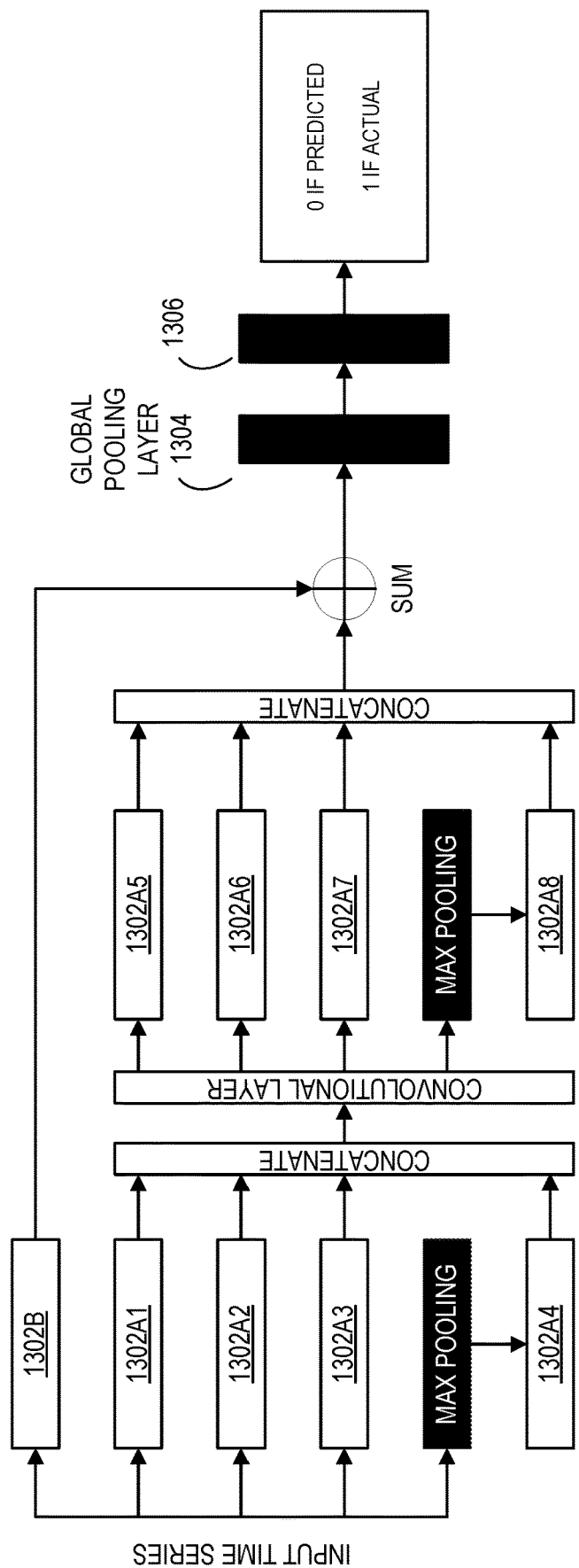
FIG. 13 schematically shows a GAN discriminator model, which may be used in the decoder of the computing system of FIG. 1.
Figure 14:
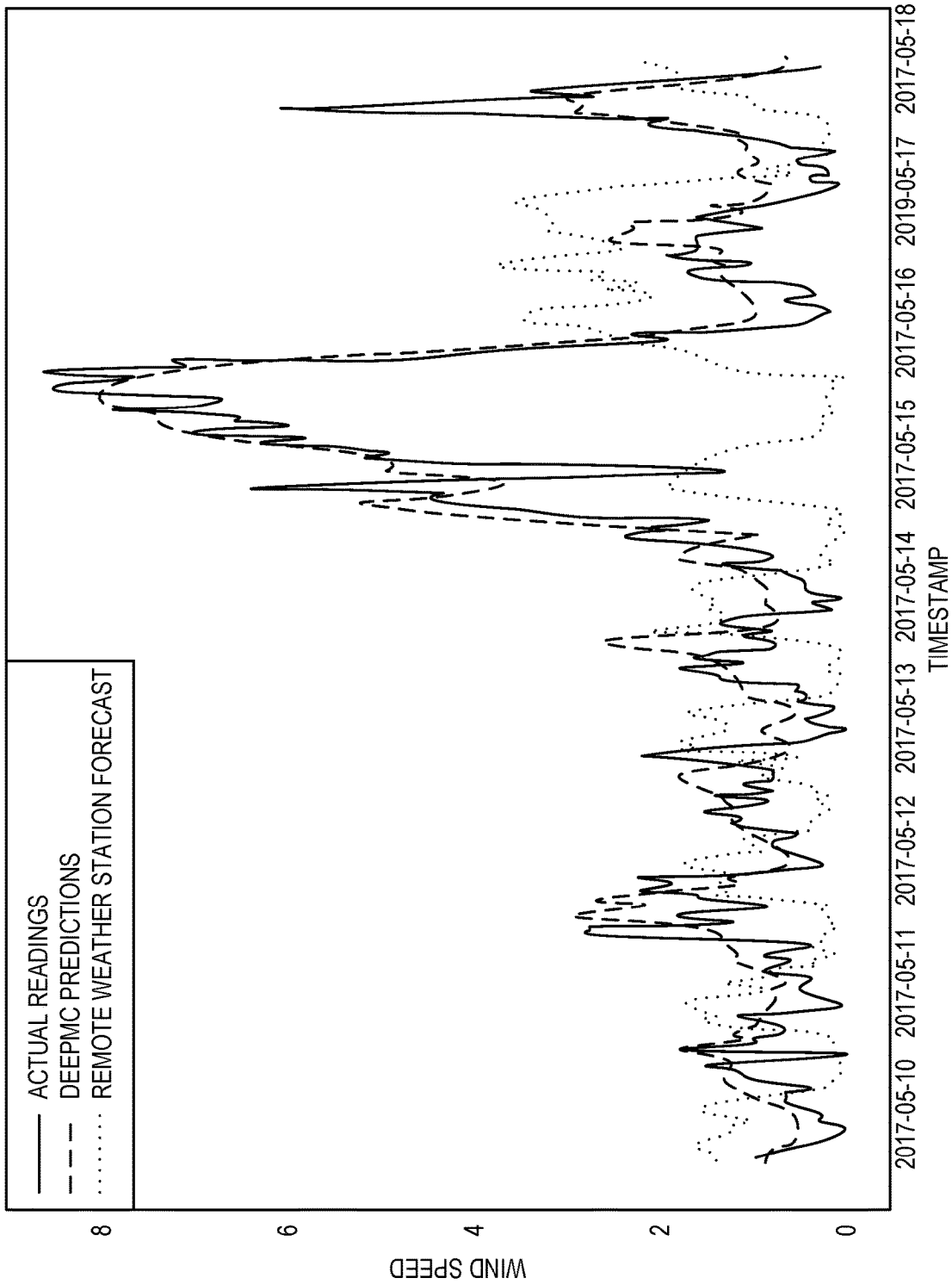
FIG. 14 shows a graph of wind speed predictions at a weather station using forecasts from a different weather station, computed by the computing system of FIG. 1.

The GAN architecture described in Section 5 uses the InceptionTime model for the discriminator 35. The model is illustrated in FIG. 13. This model uses various stacks of convolutional layers, each having ReLU as the activation function. The convolutional layers 1302A1-8 include 32 filters each of three, five and eight kernel size. The convolutional layer 1302B uses 128 filters with kernel size one. Time series data is used as input into convolutional layers 1302B, 1302A1-3, and a first max pooling layer. Output from these layers is concatenated into a single vector which is fed into a convolutional layer and features are extracted into convolutional layers 1302A5-7 and a second max pooling layer. The global pooling layer 1304 pools and averages the input across time resulting in a vector of dimension 128 which is fed into the fully connected layer 1306 with one node and sigmoid activation function. The discriminator 35 is trained using the binary cross entropy with Adam optimizer.

During transfer learning DeepMC model is updated while trying to beat the adversary which discriminates between the predicted results and the actual observation on the target domain. The algorithm is presented in Algorithm 1 in FIG. 15.

The discriminator, as it is trained, provides high accuracy (>99%+ accuracy) for time series classification.

Figure 18:
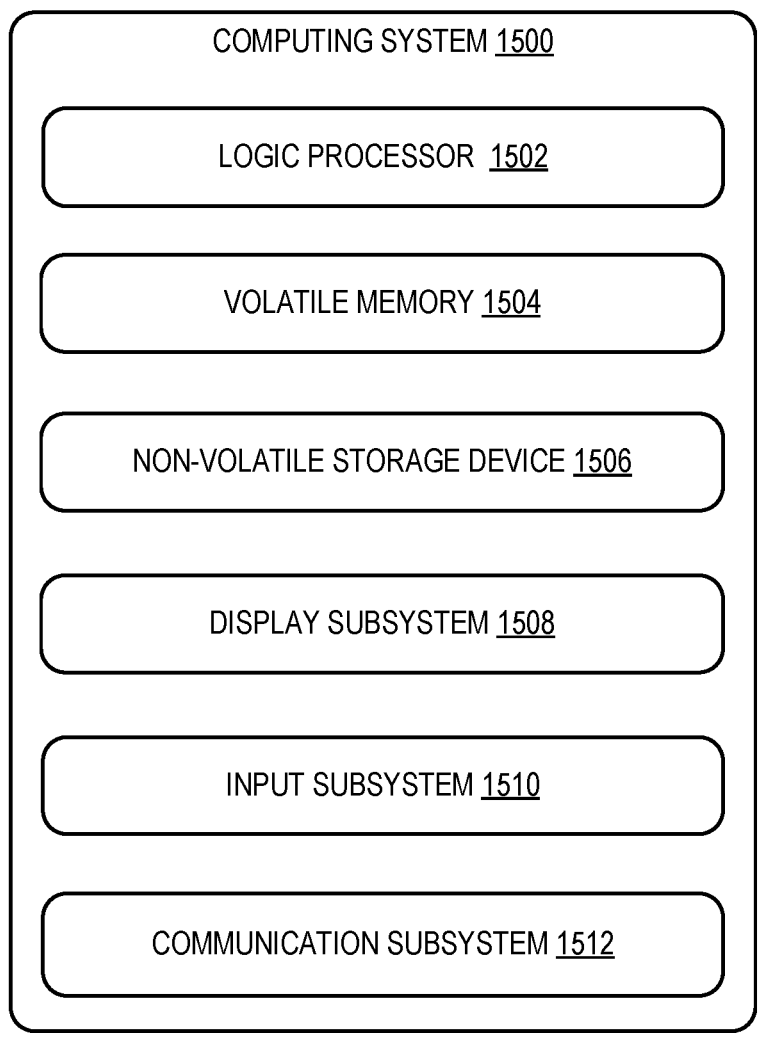
FIG. 18 illustrates an exemplary computing environment in which the computing system of FIG. 1 may be implemented.

FIG. 18 schematically shows a non-limiting embodiment of a computing system 1500 that can enact one or more of the methods and processes described above. Computing system 1500 is shown in simplified form. Computing system 1500 may embody the computer device 10 described above and illustrated in FIG. 1. Computing system 1500 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 1500 includes a logic processor 1502 volatile memory 1504, and a non-volatile storage device 1506. Computing system 1500 may optionally include a display subsystem 1508, input subsystem 1510, communication subsystem 1512, and/or other components not shown in FIG. 18.

Logic processor 1502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1506 includes one or more physical devices configured to hold instructions executable by the logic processors to implement the methods and processes described herein. When such methods and processes are implemented, the state of non-volatile storage device 1506 may be transformed—e.g., to hold different data.

Non-volatile storage device 1506 may include physical devices that are removable and/or built in. Non-volatile storage device 1506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1506 may include nonvolatile, dynamic, static, read/write, read-only, sequential-access, location-addressable, file-addressable, and/or content-addressable devices. It will be appreciated that non-volatile storage device 1506 is configured to hold instructions even when power is cut to the non-volatile storage device 1506.

Volatile memory 1504 may include physical devices that include random access memory. Volatile memory 1504 is typically utilized by logic processor 1502 to temporarily store information during processing of software instructions. It will be appreciated that volatile memory 1504 typically does not continue to store instructions when power is cut to the volatile memory 1504.

Aspects of logic processor 1502, volatile memory 1504, and non-volatile storage device 1506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1500 typically implemented in software by a processor to perform a particular function using portions of volatile memory, which function involves transformative processing that specially configures the processor to perform the function. Thus, a module, program, or engine may be instantiated via logic processor 1502 executing instructions held by non-volatile storage device 1506, using portions of volatile memory 1504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1508 may be used to present a visual representation of data held by non-volatile storage device 1506. The visual representation may take the form of a graphical user interface (GUI). As the herein described methods and processes change the data held by the non-volatile storage device, and thus transform the state of the non-volatile storage device, the state of display subsystem 1508 may likewise be transformed to visually represent changes in the underlying data. Display subsystem 1508 may include one or more display devices utilizing virtually any type of technology. Such display devices may be combined with logic processor 1502, volatile memory 1504, and/or non-volatile storage device 1506 in a shared enclosure, or such display devices may be peripheral display devices.

When included, input subsystem 1510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1512 may be configured to communicatively couple various computing devices described herein with each other, and with other devices. Communication subsystem 1512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1500 to send and/or receive messages to and/or from other devices via a network such as the Internet.

The following paragraphs provide additional support for the claims. According to one aspect, a computing system is provided that comprises a processor and associated memory storing instructions including a predictive program that when executed by the processor cause the processor to, in a training phase, receive as training data a time series of locally sourced measurements for a parameter and a time series of remotely sourced forecast data for the parameter, and train an artificial intelligence model based on the training data to output a predicted forecast offset between a current value of a remotely sourced forecast and a future locally sourced measurement for the parameter.

In this aspect, the processor may be further configured to, in a run-time phase, receive a current value for the remotely sourced forecast as run-time input into the artificial intelligence model, and determine from the artificial intelligence model a predicted forecast offset based on the run-time input.

In this aspect, the processor may be further configured to, in the run-time phase, compute a local forecast as a sum of the predicted forecast offset and the current value of the remotely sourced forecast, and output the local forecast to cause a display device associated with the computing system to display the local forecast.

In this aspect, to receive a current value for the remotely sourced forecast as run-time input into the artificial intelligence model, the processor is configured to, in the run-time phase, receive from a local sensor a time series of sensor inputs indicating respective measured values of a parameter over a time period, the sensor being geolocated in a first location; and receive time series of forecast values for the parameter from a forecast source, the forecast values having been computed based on data from sensors that are geographically remote from the first location.

In this aspect, to determine from the artificial intelligence model a predicted forecast offset based on the run-time input, the processor is further configured to, in the run-time phase, perform preprocessing of the time series of sensor inputs using a predictive model to thereby compute a predicted value for the parameter for at each successive time step in the time series, perform a forecast offset computation at each time step in the time series by determining the difference between the predicted value and the forecast value at each time step, to thereby compute a time series of forecast offsets, perform a signal decomposition on the time series of forecast offsets, wherein the time series of forecast offsets is decomposed into a multi-scale data set including at least short scale data and long scale data, process the multi-scale data set by inputting the short scale data into a short scale neural network to thereby extract short scale features of the short scale data, and by inputting the long scale data into a long scale neural network to thereby extract long scale features of the long scale data, at each time step in the time series, apply a multi-level attention mechanism, having at least two attention levels, to the extracted short scale features and long scale features, the two attention levels including a position-based content attention layer and a scale-guided attention layer, to generate respective short scale and long scale context vectors, at each time step in the time series; and perform a decoder computation in which a decoder receives the respective short scale and long scale context vectors and computes a predicted forecast offset, at each time step in the time series.

In this aspect, the parameter may be a climatic parameter, the forecast source may be a weather station, and the predicted forecast offset may be a predicted weather forecast offset for the climatic parameter.

In this aspect, the preprocessing may be performed using an autoregressive integrated moving average model.

In this aspect, the signal decomposition may include wavelet packet decomposition.

In this aspect, the short scale neural network may include a multi-layered convolutional neural network (CNN) stack including a plurality of serially linked convolutional neural networks, and the long scale neural network may include a convolutional neural network and long short term memory (CNN-LSTM) stack in which a convolutional neural network is serially linked to a long short term memory neural network.

In this aspect, the multi-scale data set may further include medium scale data, and processing the multi-scale data set may further include inputting the medium scale data into a medium scale neural network to thereby extract medium scale features the medium scale data, at each time step in the time series.

In this aspect, the short scale neural network may include a first multi-layered convolutional neural network (CNN) stack including a plurality of serially linked convolutional neural networks, the one or more medium scale neural networks may include a second multi-layered convolutional neural network (CNN) stack including a plurality of serially linked convolutional neural networks, and the long scale neural network may include a convolutional neural network and long short term memory (CNN-LSTM) stack in which a convolutional neural network is serially linked to a long short term memory neural network.

In this aspect, the decoder may be configured with an LSTM layer configured to perform the decoder computation.

In this aspect, to train the artificial intelligence model based on the training data, in the training phase, the processor may be further configured to execute a generative adversarial network (GAN), the predictive program may serve as a generator of the GAN, the instructions may further include a binary time series classifier that serves as a discriminator of the GAN, the generator may generate a first batch of training data for the discriminator including forecast offsets and associated predicted forecast offsets based thereon, the discriminator may receive the first batch of training data and may be trained to discriminate between the forecast offsets and predicted forecast offsets in the first batch of training data, the generator may generate a second batch of training data including forecast offsets and associated predicted forecast offsets based thereon, and the multilevel attention mechanism of the predictive program of the generator may be updated while the generator is pitted against the discriminator.

In this aspect, the discriminator may be trained using binary cross entropy with adapted moment estimation optimization.

In another aspect, a method for predicting a forecast offset is provided comprising in a training phase, via processing circuitry, receiving as training data a time series of locally sourced measurements for a parameter and a time series of remotely sourced forecast data for the parameter; and training an artificial intelligence model based on the training data to output a predicted forecast offset between a current value of a remotely sourced forecast and a future locally sourced measurement for the parameter.

In this aspect, the method may further comprise in a run-time phase, via the processing circuitry receiving a current value for the remotely sourced forecast as run-time input into the artificial intelligence model, and determining from the artificial intelligence model a predicted forecast offset based on the run-time input.

In this aspect, the method may further comprise in the run-time phase, via the processing circuitry, computing a local forecast as a sum of the predicted forecast offset and the current value of the remotely sourced forecast, and outputting the local forecast to cause a display device associated with the computing system to display the local forecast.

In this aspect, receiving a current value for the remotely sourced forecast as run-time input into the artificial intelligence model may include receiving from a local sensor a time series of sensor inputs indicating respective measured values of a parameter over a time period, the sensor being geolocated in a first location, and may include receiving time series of forecast values for the parameter from a forecast source, the forecast values having been computed based on data from sensors that are geographically remote from the first location. In this aspect, receiving a current value for the remotely sourced forecast as run-time input into the artificial intelligence model may include performing preprocessing of the time series of sensor inputs using a predictive model to thereby compute a predicted value for the parameter for at each successive time step in the time series, performing a forecast offset computation at each time step in the time series by determining the difference between the predicted value and the forecast value at each time step, to thereby compute a time series of forecast offsets, performing a signal decomposition on the time series of forecast offsets, wherein the time series of forecast offsets is decomposed into a multi-scale data set including at least short scale data and a long scale data, processing the multi-scale data set by inputting the short scale data into a short scale neural network to thereby extract short scale features of the short scale data, and by inputting the long scale data into a long scale neural network to thereby extract long scale features of the long scale data, at each time step in the time series, applying a multi-level attention mechanism, having at least two attention levels, to the extracted short scale features and long scale features, the two attention levels including a position-based content attention layer and a scale-guided attention layer, to generate respective short scale and long scale context vectors, at each time step in the time series; and performing a decoder computation in which a decoder receives the respective short scale and long scale context vectors and computes a predicted forecast offset, at each time step in the time series.

In this aspect, the parameter may be a climatic parameter, the forecast source may be a weather station, and the predicted forecast offset may be a predicted weather forecast offset for the climatic parameter.

In another aspect, a method for predicting a weather forecast offset is provided, the method comprising via processing circuitry, receiving from a local sensor a time series of sensor inputs indicating respective measured values of a parameter over a time period, the parameter being a climatic parameter and the sensor being geolocated in a first location, receiving time series of forecast values for the parameter from a weather station, the forecast values having been computed based on data from one or more sensors that are in a different location than the first location, performing a forecast offset computation at each time step in the time series by determining the difference between a predicted value for the parameter and the forecast value at each time step, to thereby compute a time series of forecast offsets, performing a signal decomposition on the time series of forecast offsets, wherein the time series of forecast offsets is decomposed into a multi-scale data set, processing the multi-scale data to thereby extract short scale features and long scale features therefrom, applying a multi-level attention mechanism including a position-based content attention layer and a scale-guided attention layer to the extracted short scale features and long scale features, to thereby generate respective short scale and long scale context vectors, at each time step in the time series; and, performing a decoder computation in which a decoder receives the respective short scale and long scale context vectors and computes a predicted forecast offset, at each time step in the time series, wherein the predicted forecast offset is a predicted weather forecast offset for the climatic parameter.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor and associated memory storing instructions including a predictive program that, when executed by the processor, cause the processor to:
in a run-time phase:
receive a current value for a remotely sourced forecast as run-time input into an artificial intelligence model; and
determine, from the artificial intelligence model, a predicted forecast offset based on the run-time input by causing the processor to:
perform preprocessing of a time series of sensor inputs using a predictive model to thereby compute a predicted value for a parameter for at each successive time step in the time series;
perform a forecast offset computation at each time step in the time series by determining the difference between the predicted value and the forecast value at each time step, to thereby compute a time series of forecast offsets;

perform a signal decomposition on the time series of forecast offsets, wherein the time series of forecast offsets is decomposed into a multi-scale data set including at least short scale data and long scale data;

process the multi-scale data set by inputting the short scale data into a short scale neural network to thereby extract short scale features of the short scale data, and by inputting the long scale data into a long scale neural network to thereby extract long scale features of the long scale data, at each time step in the time series;

apply a multi-level attention mechanism, having at least two attention levels, to the extracted short scale features and long scale features, the two attention levels including a position-based content attention layer and a scale-guided attention layer, to generate respective short scale and long scale context vectors, at each time step in the time series; and perform a decoder computation in which a decoder receives the respective short scale and long scale context vectors and computes a predicted forecast offset, at each time step in the time series.

2. The computing system of claim 1, wherein the processor is further configured to:

in a training phase:
receive as training data a time series of locally sourced measurements for a parameter and a time series of remotely sourced forecast data for the parameter; and
train the artificial intelligence model based on the training data to output the predicted forecast offset between a current value of the remotely sourced forecast and a future locally sourced measurement for the parameter.

3. The computing system of claim 1, wherein the processor is further configured to:

compute a local forecast as a sum of the predicted forecast offset and the current value of the remotely sourced forecast; and
output the local forecast to cause a display device associated with the computing system to display the local forecast.

4. The computing system of claim 1, wherein, to receive the current value for the remotely sourced forecast as run-time input into the artificial intelligence model, the processor is configured to:

receive from a local sensor the time series of sensor inputs indicating respective measured values of a parameter over a time period, the sensor being geolocated in a first location; and
receive the time series of forecast values for the parameter from a forecast source, the forecast values having been computed based on data from sensors that are geographically remote from the first location.

5. The computing system of claim 1, wherein the parameter is a climatic parameter, a forecast source is a weather station, and the predicted forecast offset is a predicted weather forecast offset for the climatic parameter.

6. The computing system of claim 1, wherein the preprocessing is performed using an autoregressive integrated moving average model.

7. The computing system of claim 1, wherein the signal decomposition includes wavelet packet decomposition.

8. The computing system of claim 1, wherein the short scale neural network includes a multi-layered convolutional neural network (CNN) stack including a plurality of serially linked convolutional neural networks; and
the long scale neural network includes a convolutional neural network and long short term memory (CNN-LSTM) stack in which a convolutional neural network is serially linked to a long short term memory neural network.

9. The computing system of claim 1, wherein the multi-scale data set further includes medium scale data; and
processing the multi-scale data set further includes inputting the medium scale data into a medium scale neural network to thereby extract medium scale features the medium scale data, at each time step in the time series.

10. The computing system of claim 9, wherein the short scale neural network includes a first multi-layered convolutional neural network (CNN) stack including a plurality of serially linked convolutional neural networks; and
the one or more medium scale neural networks include a second multi-layered convolutional neural network (CNN) stack including a plurality of serially linked convolutional neural networks; and
the long scale neural network includes a convolutional neural network and long short term memory (CNN-LSTM) stack in which a convolutional neural network is serially linked to a long short term memory neural network.

11. The computing system of claim 1, wherein the decoder is configured with an LSTM layer configured to perform the decoder computation.

12. The computing system of claim 1, wherein to train the artificial intelligence model based on the training data, in the training phase:

the processor is further configured to execute a generative adversarial network (GAN);
the predictive program serves as a generator of the GAN;
the instructions further include a binary time series classifier that serves as a discriminator of the GAN;
the generator generates a first batch of training data for the discriminator including forecast offsets and associated predicted forecast offsets based thereon;
the discriminator receives the first batch of training data and is trained to discriminate between the forecast offsets and predicted forecast offsets in the first batch of training data;
the generator generates a second batch of training data including forecast offsets and associated predicted forecast offsets based thereon; and
the multi-level attention mechanism of the predictive program of the generator is updated while the generator is pitted against the discriminator.

13. The computing system of claim 12, wherein the discriminator is trained using binary cross entropy with adapted moment estimation optimization.

14. A method for predicting a forecast offset, comprising:

in a run-time phase, via processing circuitry:
receiving a current value for a remotely sourced forecast as run-time input into an artificial intelligence model; and
determining from the artificial intelligence model a predicted forecast offset based on the run-time input, wherein receiving the current value for the remotely sourced forecast as the run-time input into the artificial intelligence model includes:
- receiving from a local sensor a time series of sensor inputs indicating respective measured values of a parameter over a time period, the sensor being geolocated in a first location; and
- receiving time series of forecast values for the parameter from a forecast source, the forecast values having been computed based on data from sensors that are geographically remote from the first location, and determining from the artificial intelligence model the predicted forecast offset based on the run-time input includes:
- performing preprocessing of the time series of sensor inputs using a predictive model to thereby compute a predicted value for the parameter for at each successive time step in the time series;
- performing a forecast offset computation at each time step in the time series by determining the difference between the predicted value and the forecast value at each time step, to thereby compute a time series of forecast offsets;
- performing a signal decomposition on the time series of forecast offsets, wherein the time series of forecast offsets is decomposed into a multi-scale data set including at least short scale data and a long scale data;
- processing the multi-scale data set by inputting the short scale data into a short scale neural network to thereby extract short scale features of the short scale data, and by inputting the long scale data into a long scale neural network to thereby extract long scale features of the long scale data, at each time step in the time series;
- applying a multi-level attention mechanism, having at least two attention levels, to the extracted short scale features and long scale features, the two attention levels including a position-based content attention layer and a scale-guided attention layer, to generate respective short scale and long scale context vectors, at each time step in the time series; and
- performing a decoder computation in which a decoder receives the respective short scale and long scale context vectors and computes a predicted forecast offset, at each time step in the time series.

15. The method of claim 14, further comprising:
in a training phase, via processing circuitry:
- receiving as training data a time series of locally sourced measurements for a parameter and a time series of remotely sourced forecast data for the parameter; and
- training the artificial intelligence model based on the training data to output a predicted forecast offset between the current value of the remotely sourced forecast and a future locally sourced measurement for the parameter.

16. The method of claim 14, further comprising:
- computing a local forecast as a sum of the predicted forecast offset and the current value of the remotely sourced forecast; and
- outputting the local forecast to cause a display device associated with the computing system to display the local forecast.

17. The method of claim 14, wherein the parameter is a climatic parameter, the forecast source is a weather station, and the predicted forecast offset is a predicted weather forecast offset for the climatic parameter.

18. A method for predicting a weather forecast offset, the method comprising:
via processing circuitry:
- receiving from a local sensor a time series of sensor inputs indicating respective measured values of a parameter over a time period, the parameter being a climatic parameter and the sensor being geolocated in a first location;
- receiving time series of forecast values for the parameter from a weather station, the forecast values having been computed based on data from one or more sensors that are in a different location than the first location;
- performing a forecast offset computation at each time step in the time series by determining the difference between a predicted value for the parameter and the forecast value at each time step, to thereby compute a time series of forecast offsets;
- performing a signal decomposition on the time series of forecast offsets, wherein the time series of forecast offsets is decomposed into a multi-scale data set;
- processing the multi-scale data to thereby extract short scale features and long scale features therefrom;
- applying a multi-level attention mechanism including a position-based content attention layer and a scale-guided attention layer to the extracted short scale features and long scale features, to thereby generate respective short scale and long scale context vectors, at each time step in the time series; and
- performing a decoder computation in which a decoder receives the respective short scale and long scale context vectors and computes a predicted forecast offset, at each time step in the time series, wherein the predicted forecast offset is a predicted weather forecast offset for the climatic parameter.

* * * * *